United States Patent [19]

Arnold et al.

[11] 3,787,818

[45] Jan. 22, 1974

[54] MULT-PROCESSOR DATA PROCESSING SYSTEM

[75] Inventors: John Spencer Arnold; George Morland Beck; Roger John Boom; David Cockburn Cosserat; Kenneth James Hamer Hodges; Theodor Duncan Sandeman; Roger Morley Williams, all of Ilford, England; Michael O'Halloran, Mittagong, Australia

[73] Assignee: Plessey Handel Und Investments AG, Zug, Switzerland

[22] Filed: June 22, 1972

[21] Appl. No.: 265,410

[30] Foreign Application Priority Data

June 24, 1971 Great Britain .................. 29,670/71

[52] U.S. Cl. ........................................ 340/172.5

[51] Int. Cl. ........................................ G06f 15/16

[58] Field of Search ........................................ 340/172.5

[56] References Cited

UNITED STATES PATENTS

| | | | |
|---|---|---|---|
| 3,421,150 | 1/1969 | Quosig et al. | 340/172.5 |
| 3,413,613 | 11/1968 | Bahrs et al. | 340/172.5 |
| 3,581,286 | 5/1971 | Beausoleil | 340/172.5 |
| 3,345,618 | 10/1967 | Threadgold | 340/172.5 |
| 3,623,011 | 11/1971 | Baynard et al. | 340/172.5 |
| 3,525,080 | 8/1970 | Couleur et al. | 340/172.5 |
| 3,214,739 | 10/1965 | Gountanis et al. | 340/172.5 |
| 3,480,914 | 11/1969 | Schlaeppi | 340/172.5 |
| 3,551,892 | 12/1970 | Driscoll | 340/172.5 |
| 3,297,994 | 1/1972 | Klein | 340/172.5 |

*Primary Examiner*—Paul J. Henon
*Assistant Examiner*—Mark Edward Nusbaum
*Attorney, Agent, or Firm*—Scrivener Parker Scrivener & Clarke

[57] ABSTRACT

A data processing system includes a group of peripheral units, a plurality of memory modules, a plurality of input-output channel units for use in providing access to the group of peripheral units and a plurality of processor modules. It also includes a plurality of separate data communication paths, one for each processor module and one for each input-output channel unit and each of the data communication paths is separately connected to all the storage modules and to at least one multiplex unit and each of the multiplex units is connected by an individual data transfer path to all the peripheral units of the group and all of the input-output channel units.

17 Claims, 14 Drawing Figures

Figure 1:
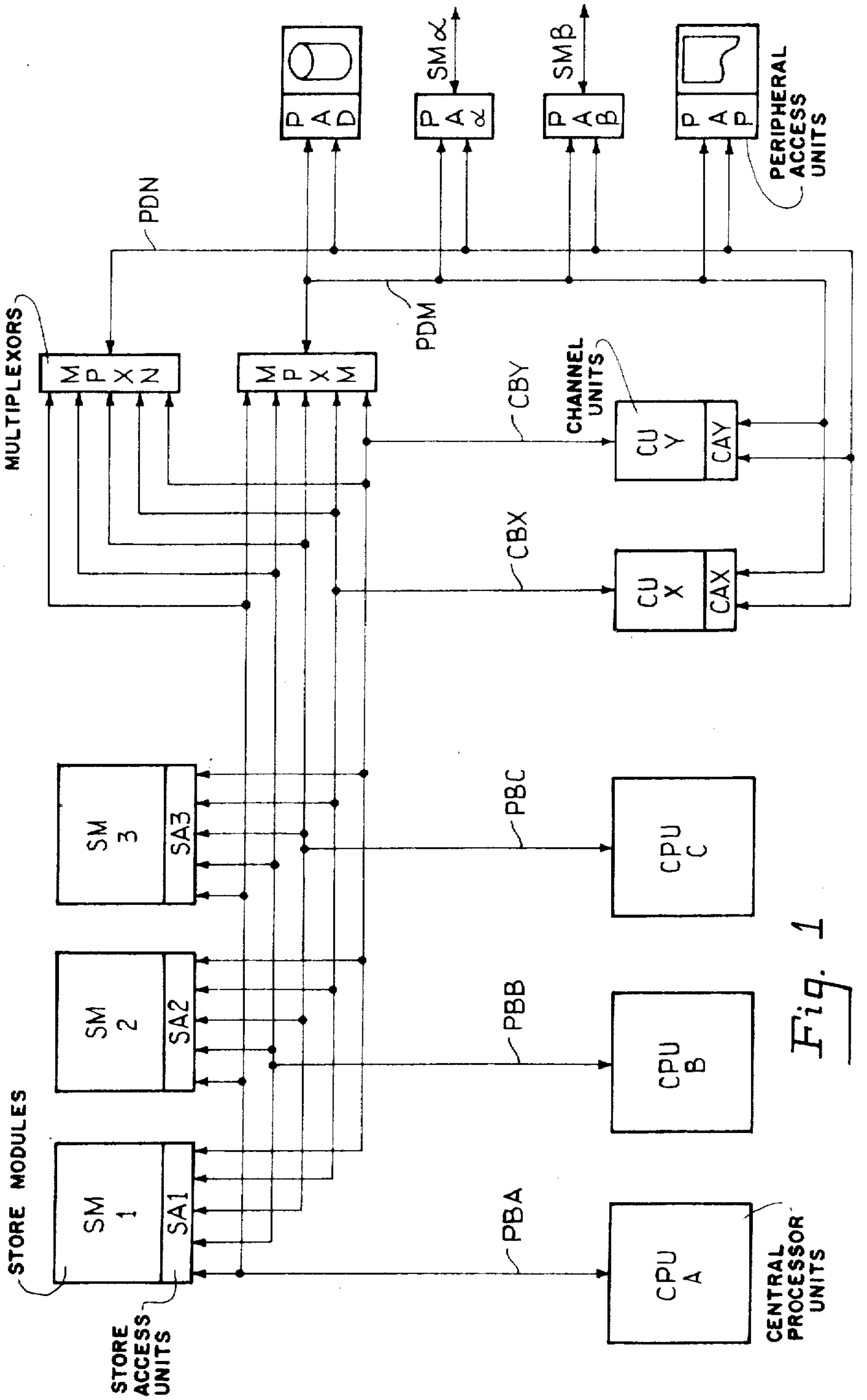

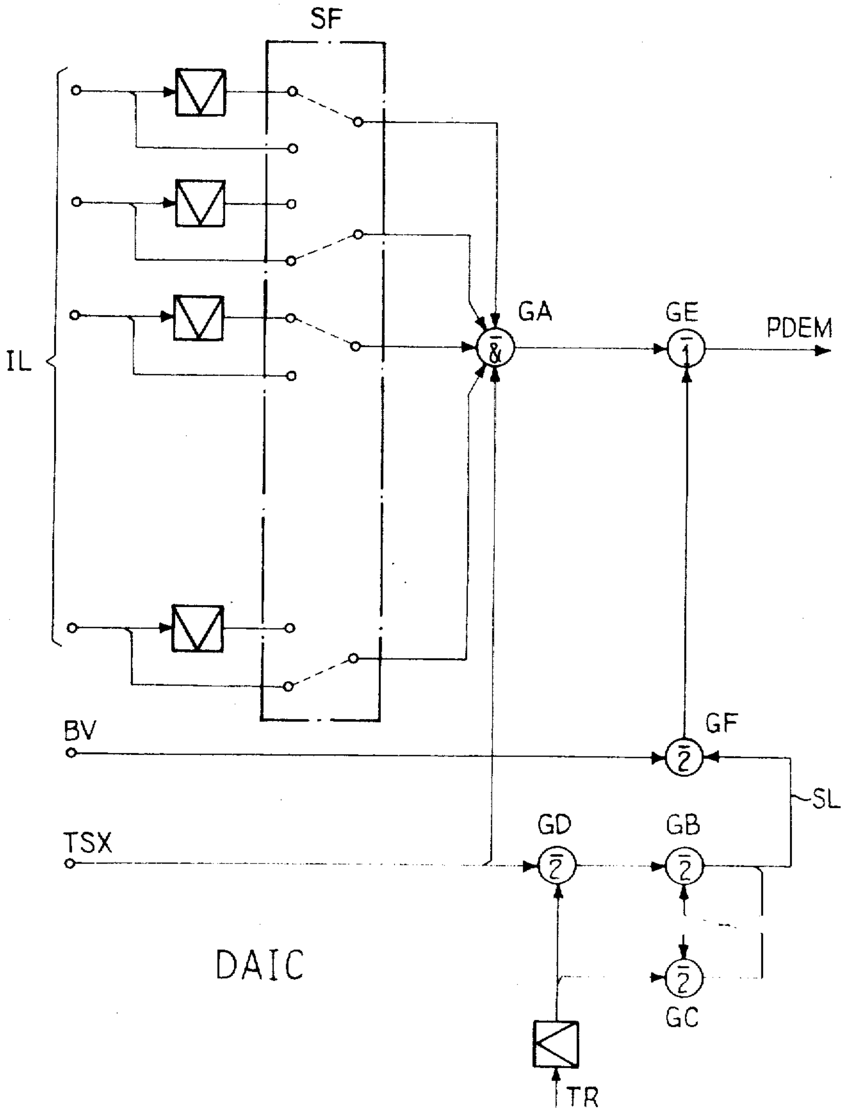
Fig. 5
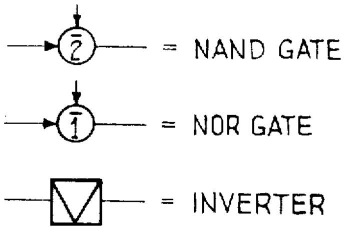

MULT-PROCESSOR DATA PROCESSING SYSTEM

The present invention relates to data processing systems and is more particularly concerned with so-called modular systems which are suitable for operation in a real-time, time-sharing environment.

A modular date processing system is one in which there is provided one or more processor modules, a common memory having one or more storage modules and one or more input/output modules, for the handling of data transfers between the peripheral equipments and the memory, together with an intercommunication medium allowing intercommunication between the memory and the processing and input/output modules. Such a modular data processing system is ideally suited to a situation where the system is required to expand during its operational life. A typical example of such a situation is encountered in the art of telecommunications where so-called stored-program-control of telephone, telegraph and data switching exchange networks is employed. It is well known in the telecommunications art that the exchange switching equipment will be required to handle an increasing number of exchange terminations and an increasing volume of traffic during its operational life. As a consequence it is necessary for the originally installed exchange equipment to be easily extended. Hence the data processing system employed to control the switching network should ideally be capable of gradual expansion to accomodate additional processing power, storage requirements and input/output facilities in as simple a manner as possible.

It is the prime object of the present invention to provide a data processing system which is ideally suited to the above mentioned circumstances by providing a modular data processing system in which additional modules may be simply added to the system to expand the facilities provided.

According to the invention there is provided a data processing system including (i) a group of peripheral equipments, (ii) a plurality of memory modules and (iii) a plurality of processor modules characterised in that each memory module and each peripheral equipment incorporates an individual access unit and each processor module is provided with a unique data communication path providing processor module access to all access units and each access unit includes an identity address recognition means and in which each peripheral equipment access unit includes a plurality of processor module accessible registers and an accessible register selection means and in which processor module access to a peripheral equipment is performed by extending an address on the processor module's unique data communication path which address comprises at least two fields, (a) one field defining the peripheral equipment required and being active upon the identity address recognition means of the appropriate access unit and (b) the other field defining the accessible register in the appropriate access unit and being active in the register selection means therein.

Also according to the invention there is provided an input/output arrangement for use in a data processing system in which said arrangement handles information in serially transmitted form and includes a switching network the ports of which are individually connectable to a plurality of peripheral devices and said switching network is arranged (i) to cyclically inspect said ports for demand conditions and (ii) upon detection of a demand condition to connect the demanding peripheral device to a free message reception device for reception of a message comprising data and address information said address information including a port identification field which is generated by said switching network and appended to the information produced by said demanding peripheral device.

Figure 2:
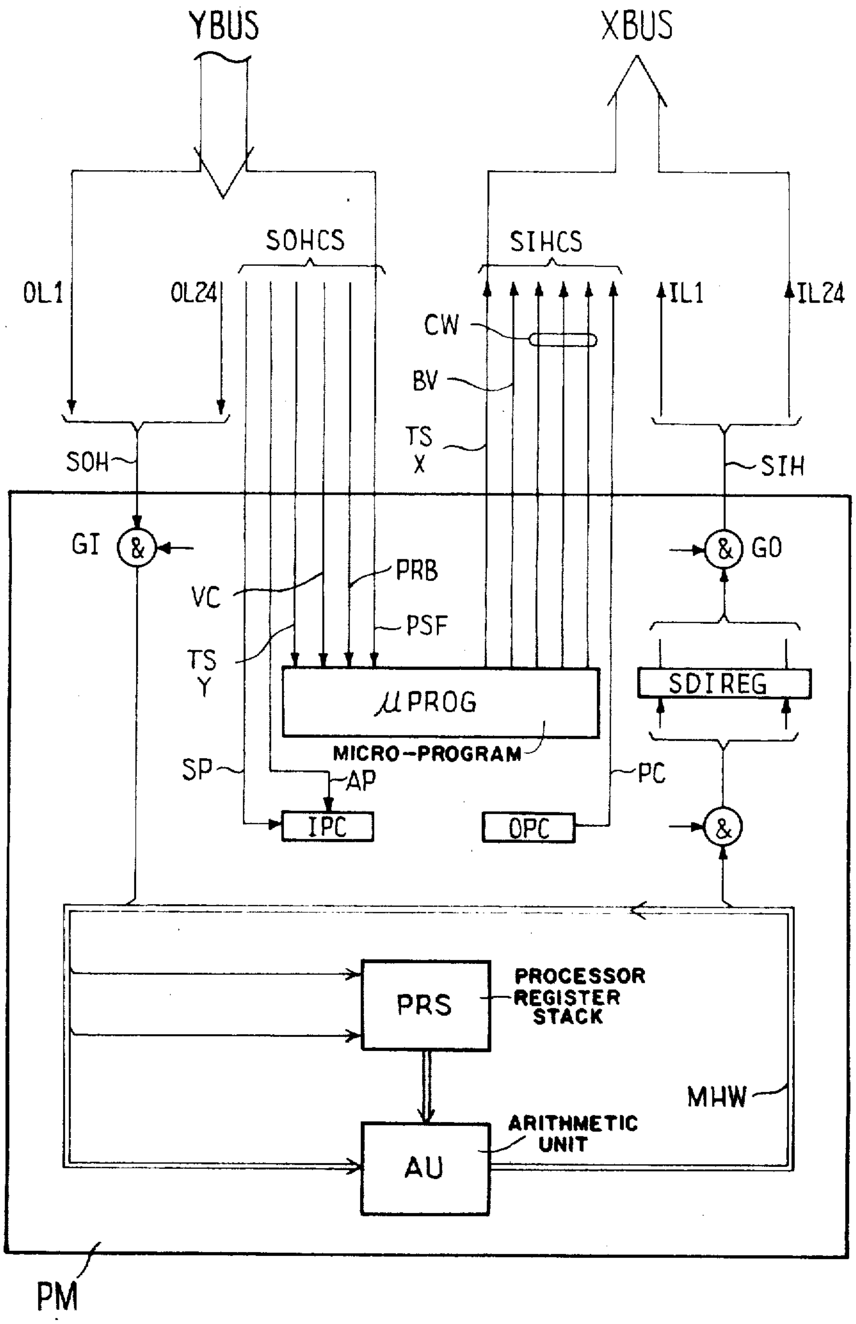
Figure 3A:
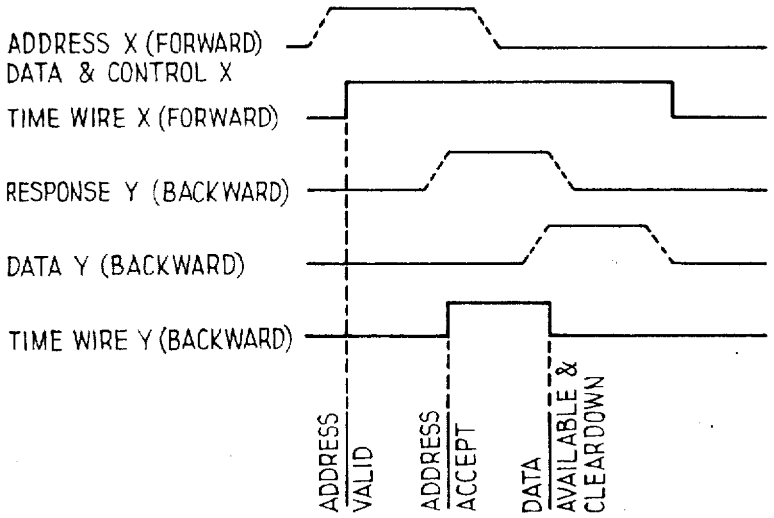
Figure 3B:
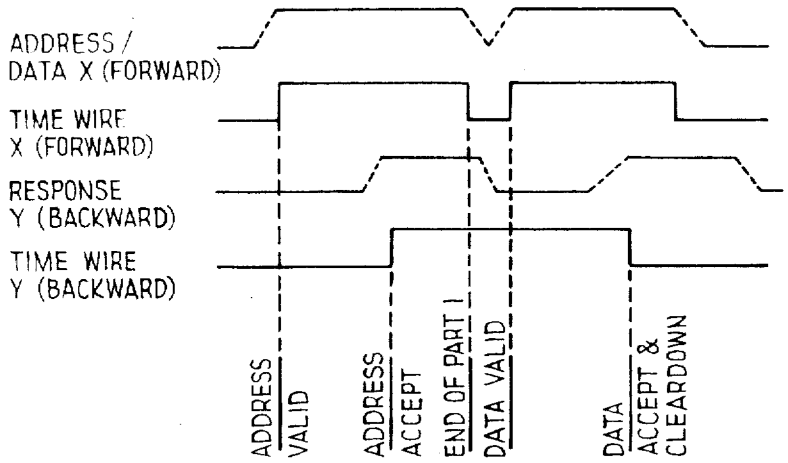
Figure 4:
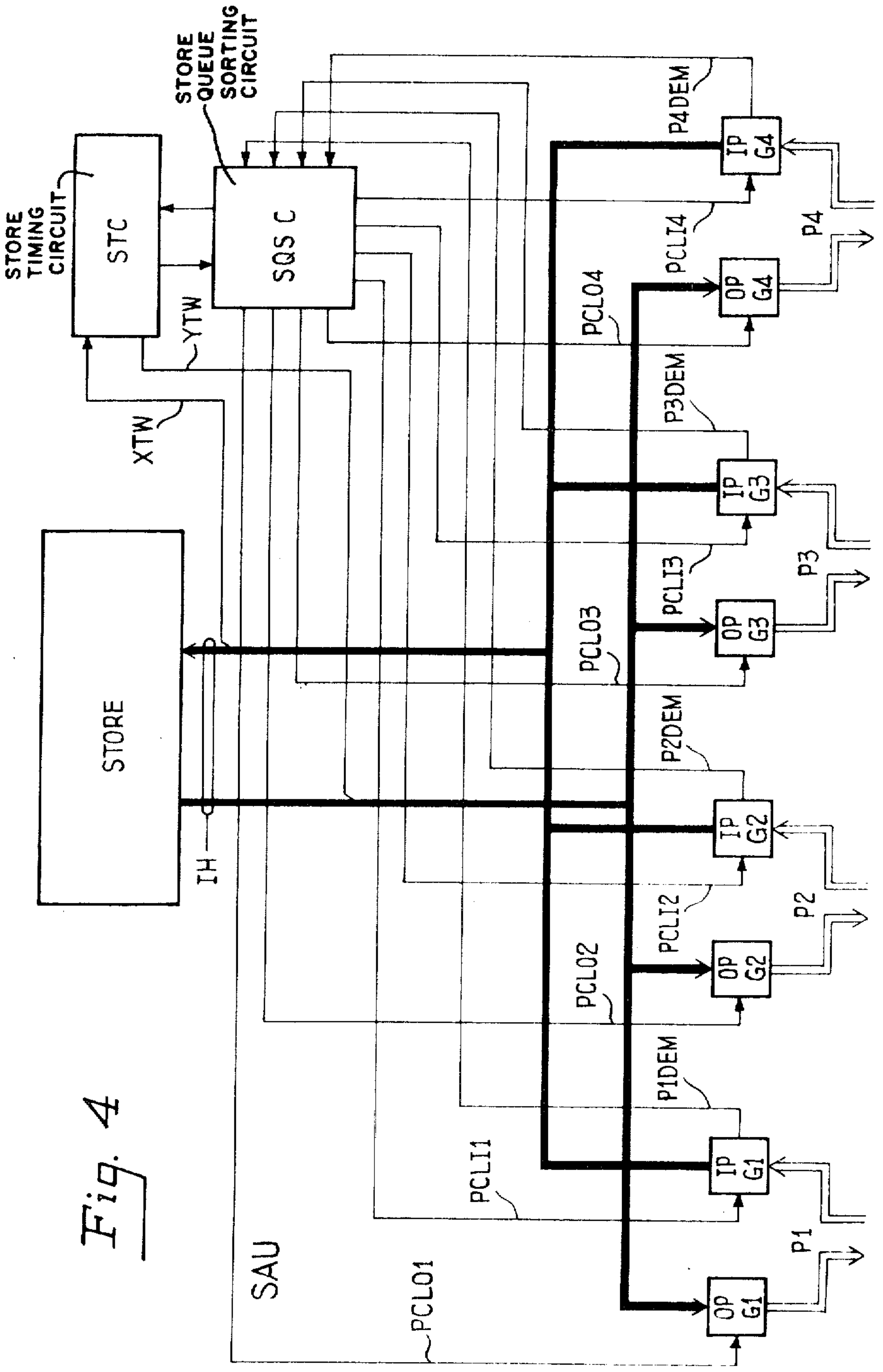
Figure 6:
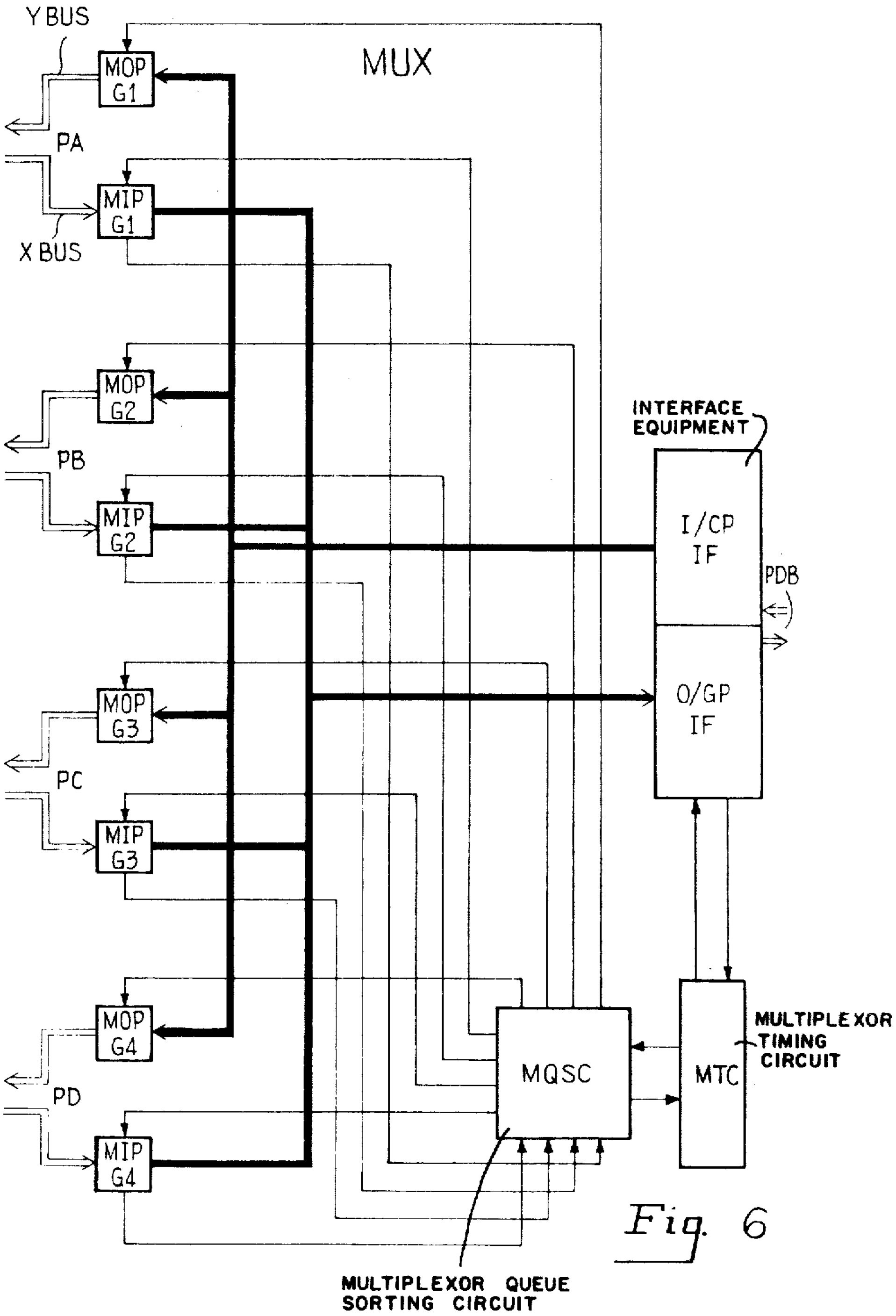
Figure 7A:
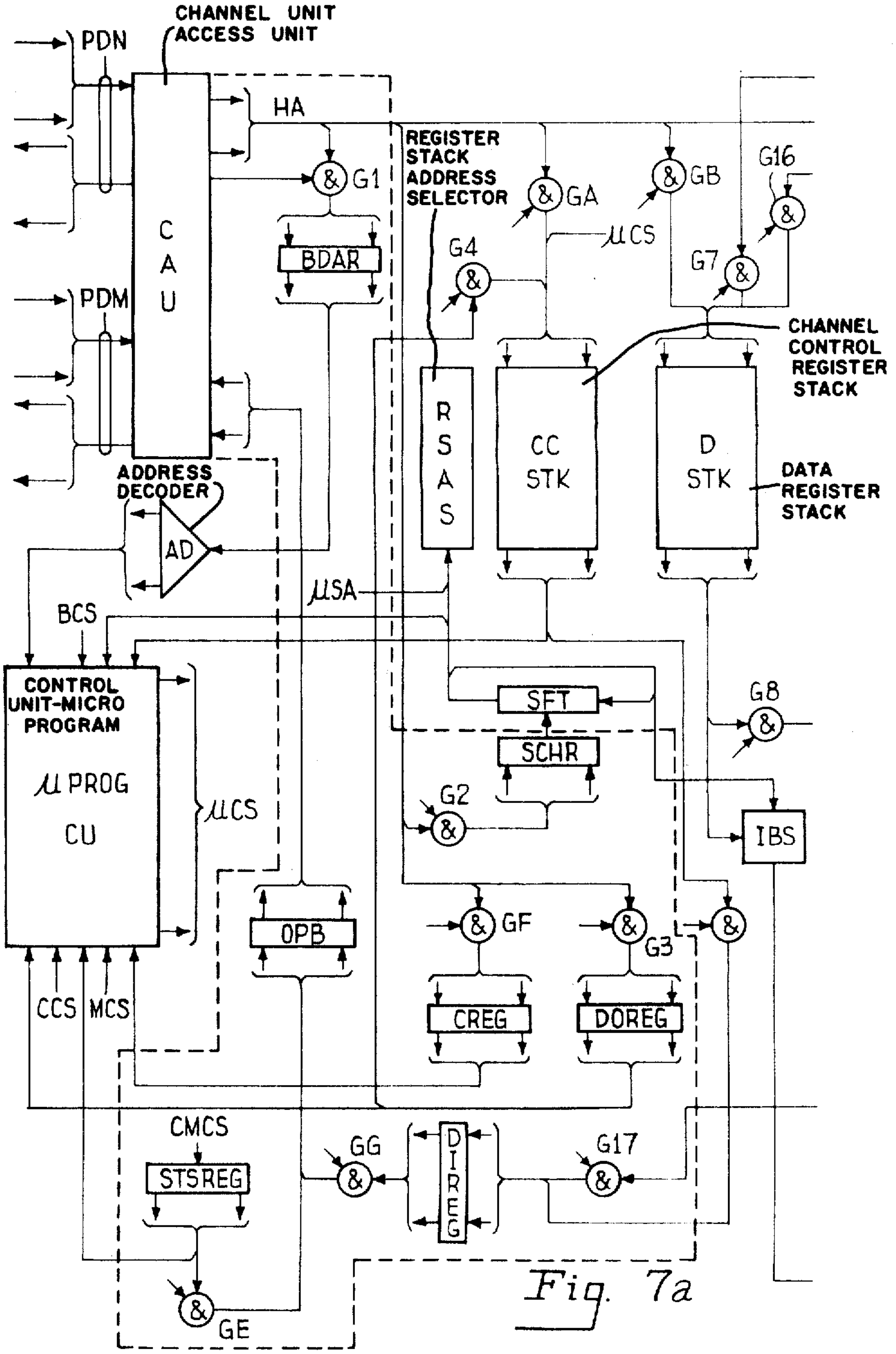
Figure 7B:
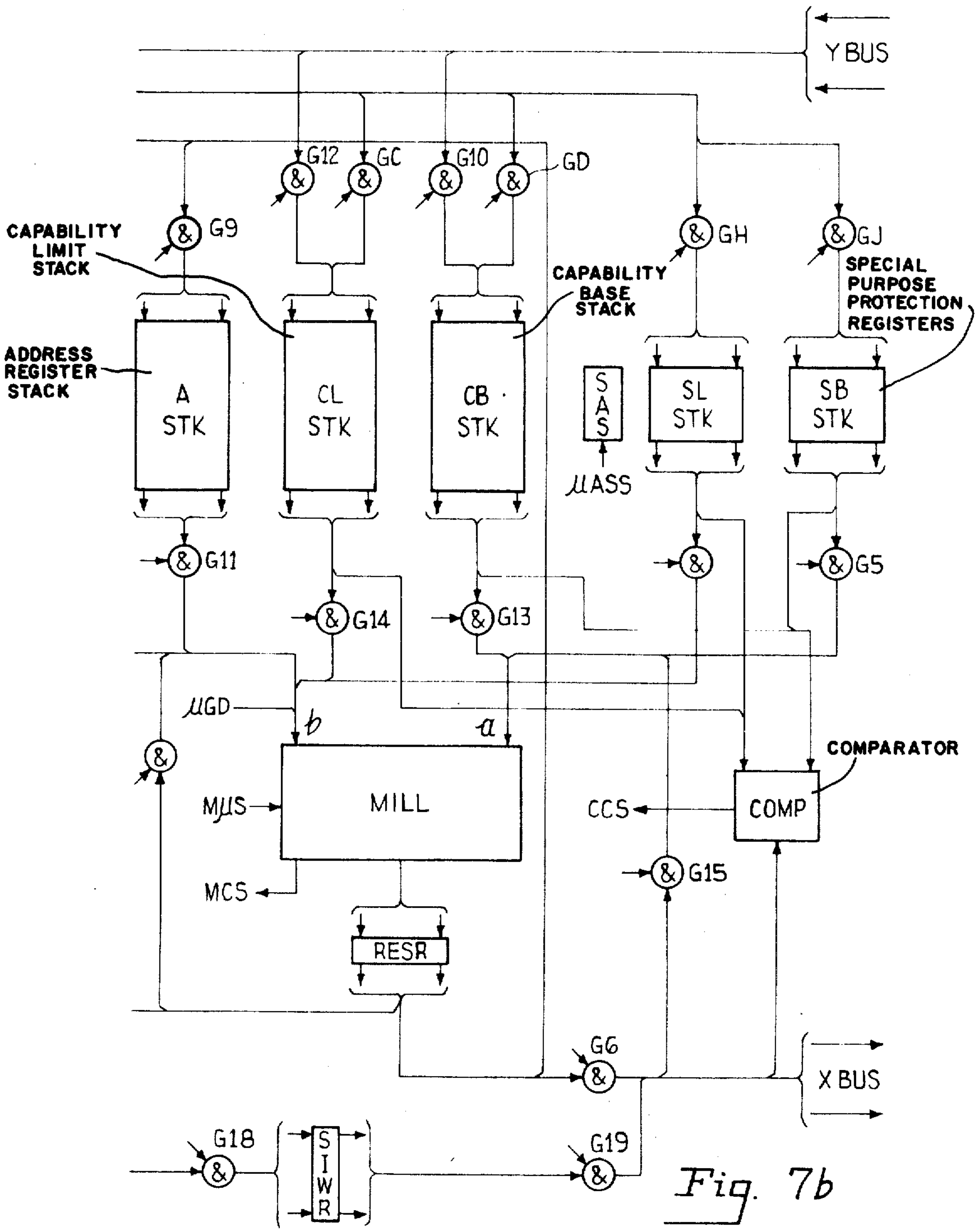
Figure 8:
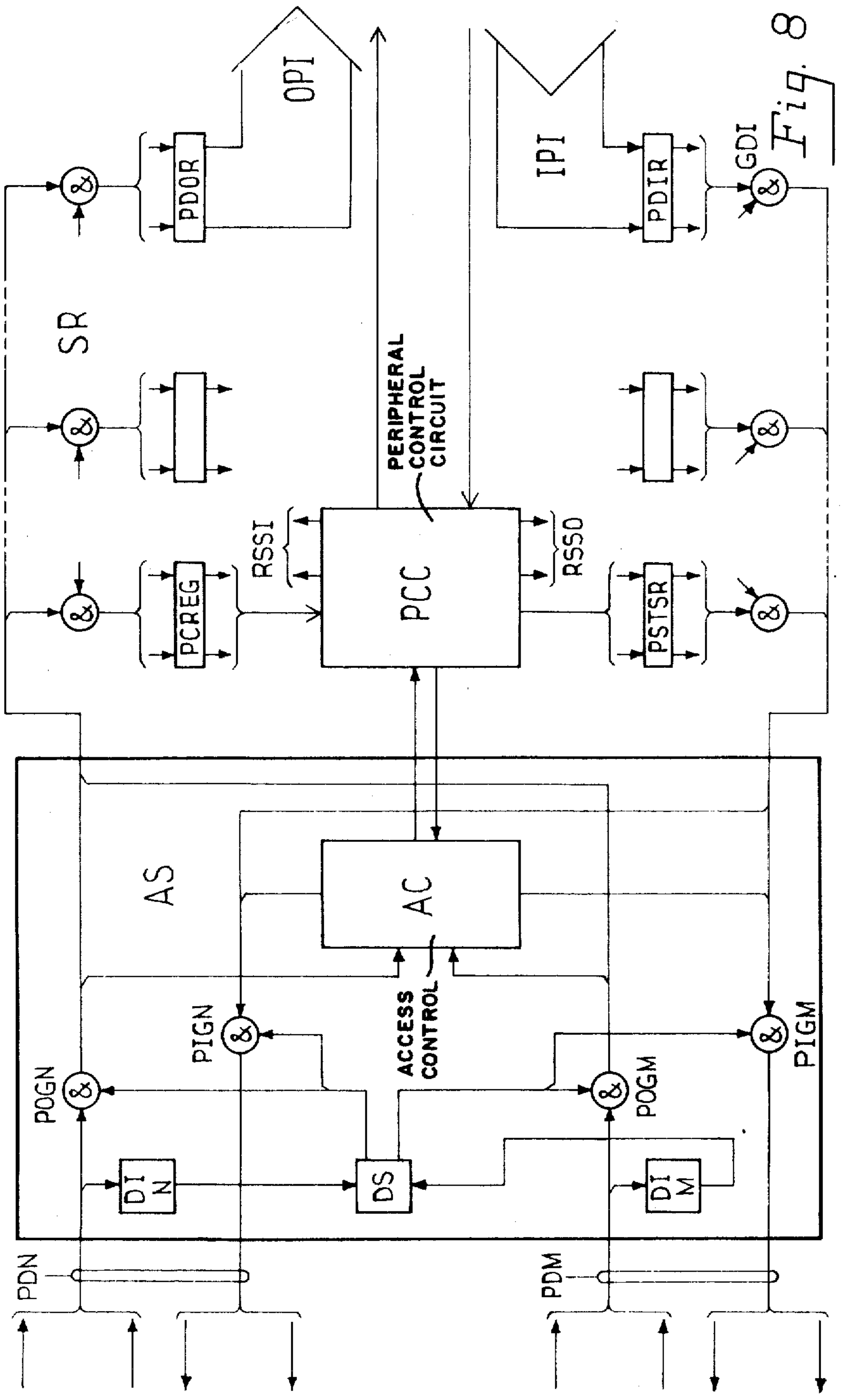
Figure 9:
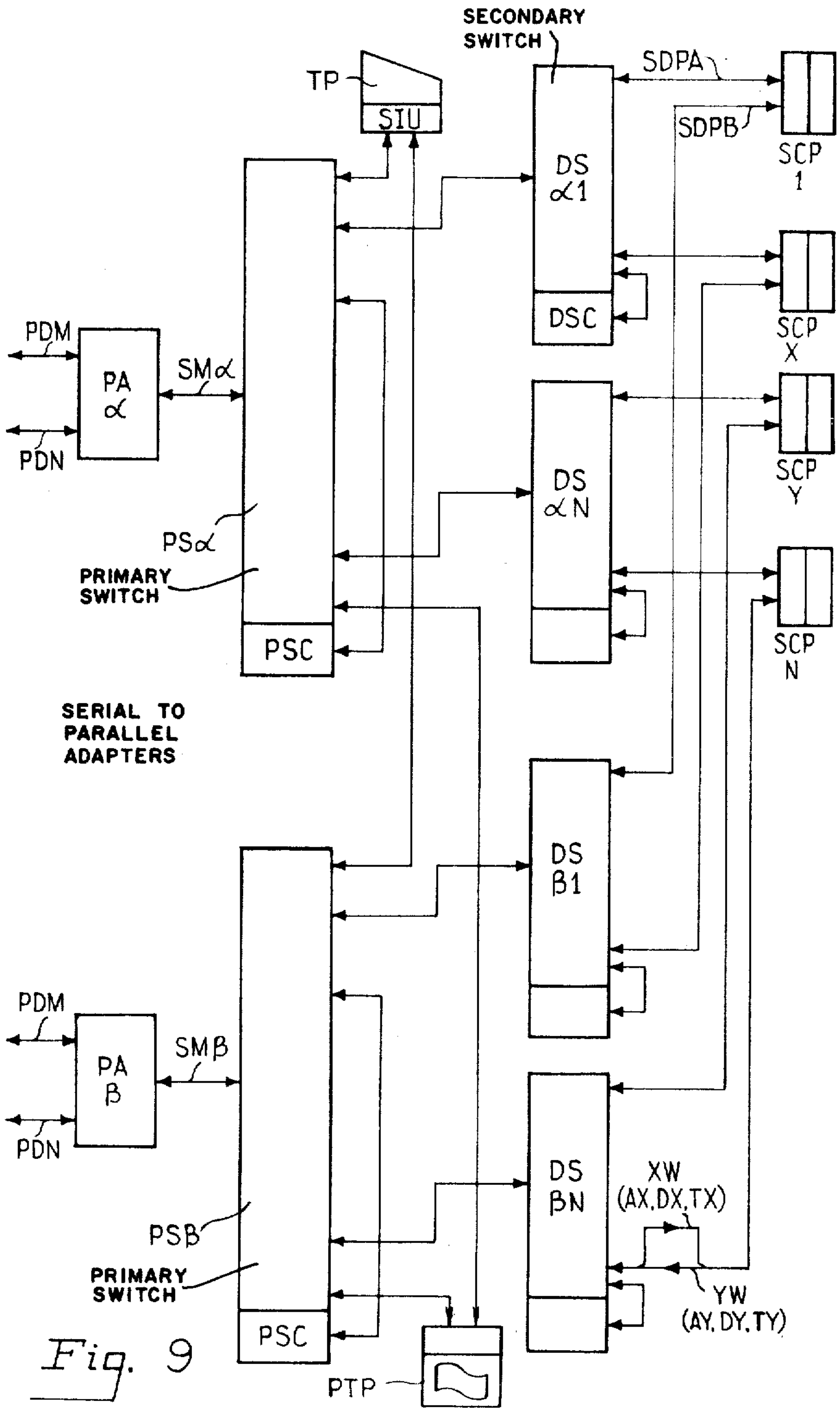
Figure 10:
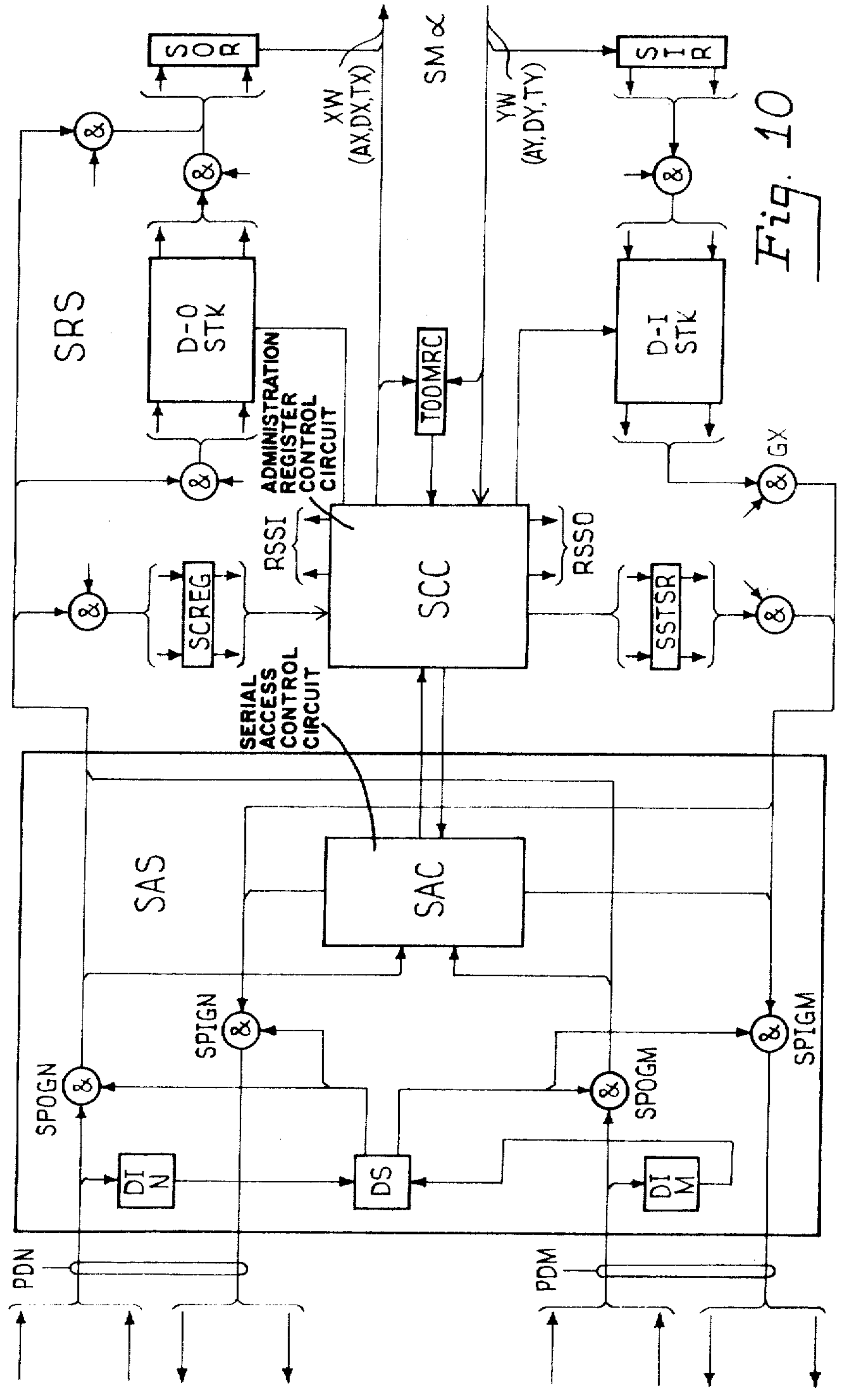
Figure 11:
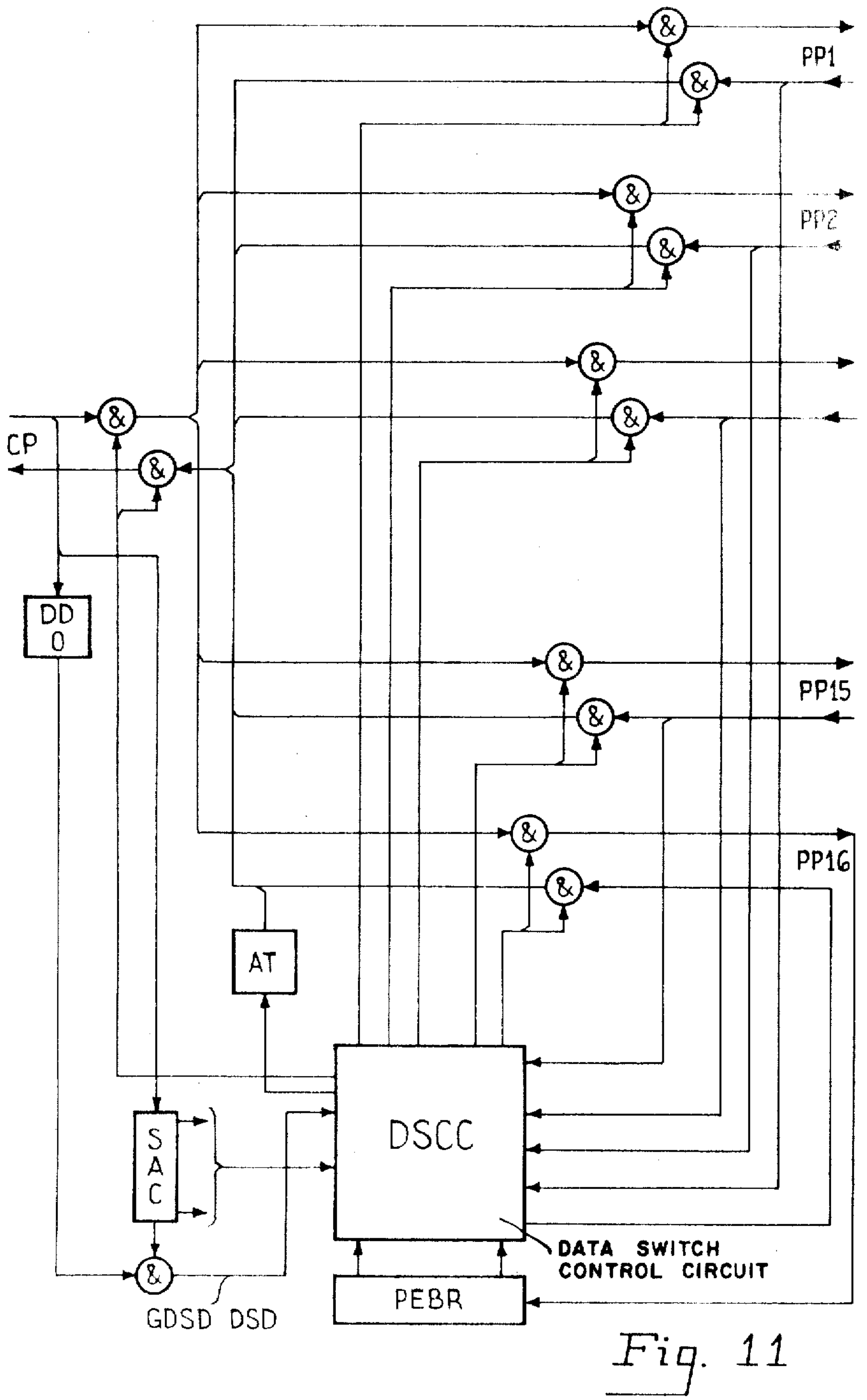
Figure 12:
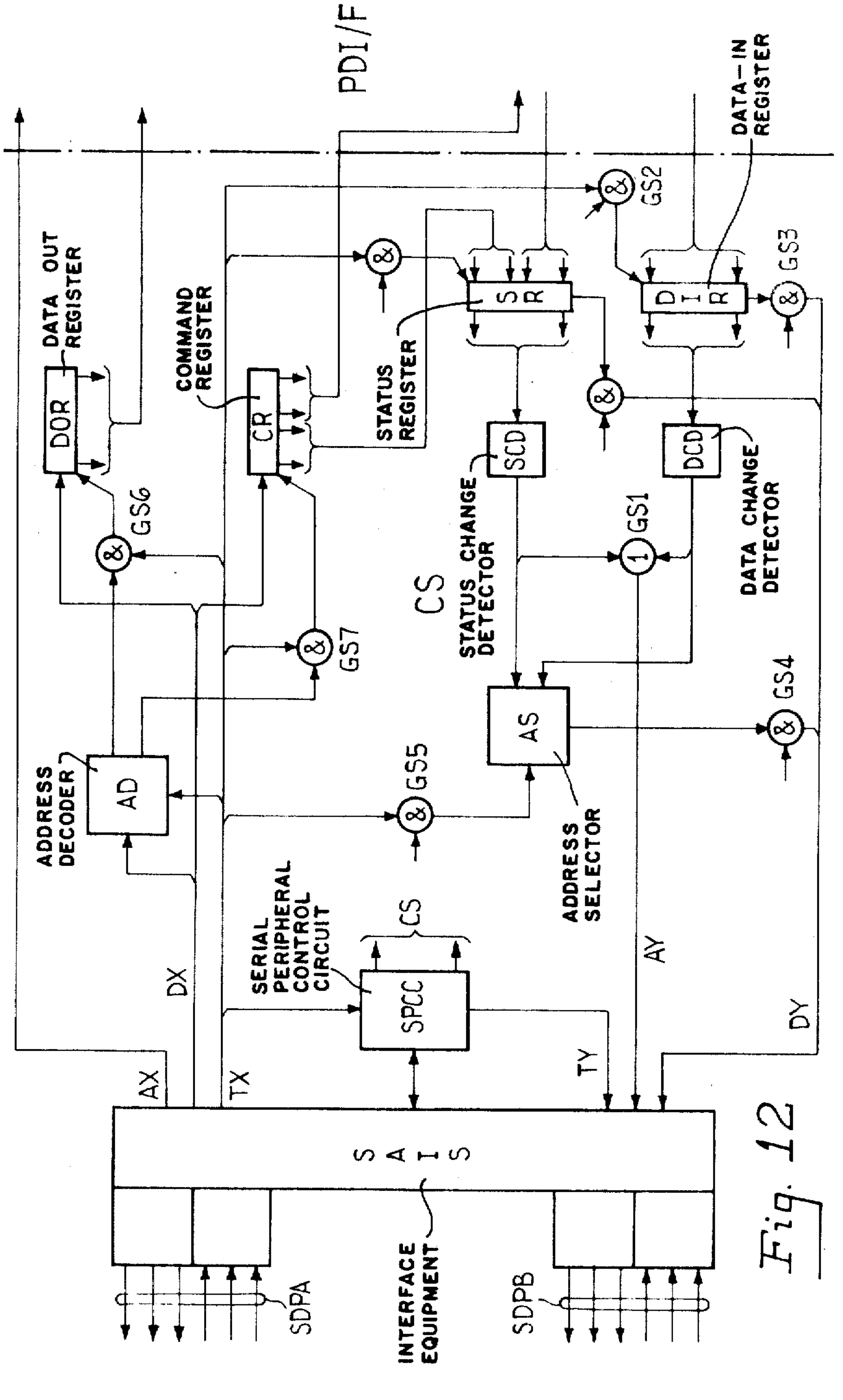

The invention together with its various features will be more readily understood from the following description which should be read in conjunction with the accompanying drawings. Of the drawings:

FIG. 1 shows a block diagram of the data processing system according to one embodiment of the invention, FIG. 2 shows a block diagram of the relevant equipment provided in a processor module, together with the wires used in a processor bus, for use with the embodiment of the invention, FIG. 3*a* shows a timing diagram of the read transfer sequence on a processor bus whereas FIG. 3*b* shows the timing diagram of the write transfer sequence, FIG. 4 shows a block diagram of an access unit for a storage module for use in the embodiment of the invention, FIG. 5 shows a logic diagram of a demand address interrogation circuit for use in an access unit, FIG. 6 shows a block diagram of a multiplexor module, FIG. 7*a* and 7*b* when placed side by side with FIG. 7*b* on the right show a block diagram of a channel module, FIG. 8 shows a block diagram of an access unit for a peripheral equipment, FIG. 9 shows a block diagram of the so-called serial medium for use with the invention, FIG. 10 shows a block diagram of a so-called serial-to-parallel adaptor for use in one embodiment of the serial medium, FIG. 11 shows a block diagram of a data switching stage for use in one embodiment of the serial medium whereas FIG. 12 shows a block diagram of a serial interface unit for use in one embodiment of the serial medium.

Considering firstly FIG. 1 it will be seen that the modular data processing system of the embodiment of the invention includes (i) a number of peripheral equipments such as PD (magnetic disc or drum), PP (page printer) and serially activated peripheral equipment which are served by leads PS$\alpha$ and PS$\beta$, (ii) three memory modules SM1, SM2 and SM3, (iii) a pair of input/output channel modules CUX and CUY, (iv) three processor modules CPUA, CPUB and CPUC and (v) a pair of multiplexors MPXN and MPXM.

Each processor module and each channel module is provided with a discrete data communication path or bus (PBA, PBB and PBC for processor modules CPUA, CPUB and CPUC respectively and CBX and CBY for channel units CUX and CUY respectively). Each processor bus PBA, PBB, PBC and each channel unit bus CBX and CBY is terminated upon a separate port of (i) each storage module access unit (i.e. access units SA1, SA2 and SA3 of storage modules SM1, SM2 and SM3 respectively) and (ii) each multiplexor MPXN and MPXM. Each multiplexor multiplexes the demands on the busses onto a single peripheral data bus (PDN and PDM) which is terminated upon a separate port of each peripheral equipment access unit (PAD, PAX, PAB and PAP) and each channel module access unit (CAX and CAY). A multiplexor module is incorporated into the system to remove the need for a variable port facility on each peripheral equipment access unit and each channel module access unit. Consequently the peripheral equipment access units are rendered insensitive to growth in the form of additional processor or storage modules.

All the access units and the multiplexor modules are provided with the facility of recognizing coded information applied to the busses terminated upon their input ports which corresponds with their own system address identity and of multiplexing such addressed demands into the module, equipment or peripheral bus they serve. The storage module access units (SA1, SA2 and SA3) and multiplexors MUXN and MUXM are very similar in construction one giving access to a storage module whereas the other gives access to a peripheral bus; both include facilities for queuing demands in priority order. Each peripheral equipment access unit functions in a similar manner to a store access unit giving addressed access to a small number of peripheral equipment administration registers which include command, data and status registers. Similarly the channel module access unit (CAX or CAY) functions in a similar manner to the peripheral equipment access units allowing addressed access to input/output channel administration registers including command, data and status registers.

From the above it can be seen that the data processing system configuration is such that each processor module is able to directly address any storage location, any peripheral equipment command, data or status register or any channel module control, data or status register as though it were part of a common pool of storage equipment. Similarly each channel module may directly address any memory location and any peripheral equipment command, data or status register. As a consequence no input/output instructions *per se* are required in the processor module's instruction repetoire as simple memory read and write instructions are sufficient to communicate with the peripheral equipment and channel module administration registers. Similarly data transfers between peripheral equipments and the store may be controlled by a channel module executing similar memory read and write instructions on storage locations and peripheral equipment administration registers completely independently from the functioning of the processor modules. The facility, of direct communication with the channel module administration registers by a processor module allows that processor module to set up input/output block transfers which may then be scheduled for successive individual word transfers by the channel module independently of the processor module setting up the transfer.

Considering now each component part of the system of FIG. 1 in more detail.

1 PROCESSOR MODULE

The equipment provided in a processor module for use with the embodiment of the invention is shown in block diagram form in FIG. 2. Typically the processor module may be of the type disclosed in co-pending application Ser. No. 146,334. The processor module PM includes a parallel internal highway MHW by way of which manipulated data is circulated between the processor registers PRS and the arithmetic unit AU. In the upper parts of FIG. 2 the various leads forming a processor bus are shown. The processor includes data-input-gating GI and data-output-gating GO allowing (a) information on the store output leads OL1 and OL24 of the Y BUS to be fed into the internal highway MHW and (b) information on the internal highway MHW to be fed, by way of the store data input register SDIREG, onto the X BUS. Each processor module is micro-program controlled by μPROG and some of the bus control signals activate the micro-program control unit whereas some of these control signals are generated by the micro-program control unit. The processor module also includes an incoming parity circuit IPC and an outgoing parity circuit OPC. The processor module also includes an interrupt mechanism allowing the completion or start of peripheral equipment activity to be detected and typically this is of the type disclosed in co-pending application, Ser. No. 176,464.

2 PROCESSOR BUS

The upper part of FIG. 2 shows the leads involved in each processor bus and it comprises thirty leads in each direction. The X BUS carries signals which are transmitted by the processor or so-called active module (i.e. in the go direction) whereas the Y BUS carries signals which are transmitted by the storage or multiplexor or so-called passive modules (i.e. in the return direction). Each group of thirty signal leads is divided into information and supervisory (i.e. control/response) sections those shown as SIH being information signal leads in the X BUS (go bus) together with the control signal leads SIHCS, whereas those shown as SOH are information signal leads in the Y BUS (return bus) with response signal leads SOHCS.

X BUS

In the X or forward going direction the 24 information leads IL1 to IL24 carry information from the active module to the passive module. Both address words and data words share these signal paths during a write cycle whereas only address words use these leads during a read cycle. The control signal leads SIHCS carry control signal information from the active module to the passive module addressed. The control field is made up of the separate control functions parity, command and bus valid. The single parity control lead PC carries an indication of the type of parity (i.e. odd or even) to be generated in the passive module. The three command wires CW control the operation (Read, Read and Hold, Write or Reset) required. The three wires are redundantly coded to protect against single bit errors in transmission. The relevant command codes are binary coded so that decimal one defines "Read," two defines "Read and Hold," four defines "Write" and seven defines "Reset." The "bus valid" lead BV controls the passive module's acceptance of any message transfer. Only when the active module driving a bus is switched on and operating within predetermined conditions will the "bus valid" signal enable the passive module to accept the other 29 signal paths. Typically in the processor module the detection of a severe fault condition may be used to reset a toggle which removes the bus valid condition from lead BV. Such toggle activation may be initiated when the power supplies to the processor module are detected as drifting outside some predetermined safe threshold condition. Finally the timing lead TX carries a timing signal which indicates to the passive module addressed that the active module has set up a demand for access.

Y BUS

In the Y or backward going direction the 24 information leads OL1 to OL24 are used only on read operations to carry the data word read from the passive module to the active module. The response signal leads SOHCS carry response information from the passive module to the active module. The response section is made up of a timing wire together with five linearly coded signals known as "stored parity" SP, "accumulated parity" AP, "valid cycle" VC, "peripheral register busy" PRB and "peripheral status fault" PSF. The stored parity signal SP indicates the value of the parity bit returned from the passive module with the data word from the addressed location when a read operation is performed. The accumulated parity signal AP returns the accumulated parity check bit value, constructed as odd parity over the successive forward data and parity control wires, during one access. The valid cycle signal VC acknowledges to the active module the acceptance of the demand and the control code by the passive module during each cycle. The peripheral register busy signal PRB is used, by a peripheral equipment, to indicate to the active module that a "shared register" is busy. The peripheral status fault signal PSF is used by a peripheral equipment to indicate to the active device that a fault status condition has occurred within the peripheral equipment or its access unit. Finally the timing lead TY carries a timing signal, generated by the passive module to indicate to the active module that a demand for access has been accepted, or that a cleardown sequence has been entered.

FIGS. 3*a* and 3*b* show the read and write transfer sequences which are initiated by an active module but are synchronised from the passive interface to provide a "full handshake" transfer operation. Referring firstly to FIG. 3*a* the read sequence will be considered.

The read sequence is used by an active module when one twenty-four bit data word is required to be selected from the "memory." It will be recalled that the "memory" not only includes the individual memory locations in the storage modules but also the administration registers in the access units of the channel modules and the peripheral equipments. The required address is forwarded on leads IL1 to IL24 of FIG. 2 by the active module to the passive module and the data word addressed is then returned by the passive module to the active module.

FIG. 3*a* shows the states of the timing, control and information wires in the X (forward) direction, and the states of the timing, response and information wires in the Y (backward) direction during a read operation. A READ operation begins when an address is placed on the X (forward) going information wires together with the READ control signal. The X (forward) going timing wire is raised or marked and is maintained in that condition until either a timeout period is exceeded or there is a response from the accepting-end. The accepting-end (storage module, channel module or peripheral equipment) responds by raising or marking the Y (backward) going timing wire, together with markings on the requisite response wires. If the accepting-end has detected an invalid control signal, the valid cycle response wire will be at the quiescent condition at this point in time. The accumulated parity wire will indicate the parity of the forwarded address, which has been received at the passive module. The accepting-end next lowers the Y (backward) going timing wire and this indicates that the addressed data has been placed on the Y (backward) going information wires and will remain valid for a defined period. Finally, the X (forward) going timing wire is lowered.

The write sequence is used by an active module when one twenty-four bit data word is required to be stored at a defined "location" in the "memory." The address of the required "location" is forwarded by the active module and after it has been accepted by the passive module the data word to be written is forwarded.

FIG. 3b shows the state of the timing control and information wires in the X direction and the states of the timing, response and information wires in the Y direction, during a WRITE operation. A WRITE operation begins when an address is placed on the X (forward) going information wires together with the WRITE control signal. The X (forward) going timing wire is raised and is maintained in that condition until either a timeout period is exceeded or there is a response from the accepting-end (storage module, channel module or peripheral equipment). The accepting-end responds by raising the Y (backward) going response and timing wires. If the accepting-end has detected an invalid control signal, the valid cycle wire will be at the quiescent condition at this point in time. The accumulated parity wire will indicate the parity of the forwarded address which has been generated at the passive module. The initiating end next lowers the X (forward) going timing wire, applies the data word to be written to the X (forward) going information wires and raises the X (forward) going timing wire. The accepting-end responds by lowering the Y (backward) timing wire. If the accepting-end has detected an invalid control signal, or a peripheral-timeout, the valid cycle wire will be at the quiescent condition at this point in time. The accumulated parity wire will contain the combined parity over the forwarded address and data word which has been generated by the passive module. This parity condition is also set into the 25th bit of the selected storage location if a storage word has been addressed.

The read and hold sequence is identical to the READ operation except that the "READ and HOLD" signal is placed on the X (forward) going control wires. The access unit recognises this code and locks the access unit so that any accesses attempted on other inlet ports are not accepted until the "hold" condition is terminated. A subsequent WRITE or RESET operation on the same bus to the same unit resets this condition. If one of these operations is not performed within 10 μsecs the access unit will "time out" and release automatically.

The reset sequence begins when an address is placed on the X (forward) going data wires together with the reset control signal. The X (forward) going timing wire is raised and is maintained in that condition until either a timeout period is exceeded or there is a response from the accepting-end. The accepting-end responds by raising the Y (backward) going timing wire. If the accepting-end has detected an invalid control signal, the valid cycle will be at the quiescent condition at this point in time. The accumulated parity wire will indicate the parity of the forwarded address which has been generated at the access wire. The initiating end next lowers the X (forward) going timing wire and this causes the accepting-end to lower its Y (backward)

going timing wire in turn. The Reset control signal causes the passive module's access unit to release any previous hold condition to allow access on other inlet ports.

3 STORE ACCESS UNIT

Referring now to FIG. 4 consideration will be given to a store access unit SAU. The access unit shown in FIG. 4 depicts four ports P1 to P4 only for ease of presentation and it should be realised that more ports may readily be provided as required. Each port terminates the Y and X bus sections of a computer or channel module bus, upon output and input gating arrays such as OPG1 and PG1. These gating arrays are used to gate the data and control/response signals from or to the port serving bus, from or to the internal highway IH which serves the store module store. The gating actions are under the control of port clocking signals such as PCLO1 and PCLI1 which are produced by the store access demand queue sorting control circuit SQSC. The input gating array for each port such as IPG1, also includes a demand address interrogation circuit which is shown in FIG. 5.

The demand address interrogation circuit DAIC produces a port demand signal on lead PDEM which is fed to the demand queue sorting control circuit each time the circuit recognises a "plugged-up" address on the relevant data leads IL of the X BUS of the computer or channel module bus connected to the port. The number of IL leads involved in the module address operation are taken in true and inverse form to a strapping field SF whose outputs are connected to a multi-input NAND gate GA. Either the true or inverse condition of each lead is strapped to the corresponding gate input lead in accordance with the "plugged-up" address code required. For example if it is assumed that the four most significant bits of each address word are used to define the module address and the module in question is given an address of 0101 the strapping field will be set up as shown in FIG. 5. Each time the module address of 0101 is applied to the four most significant bits of the data leads IL of the X BUS gate GA will be opened by the "one" state timing pulse on the timing wire TSX. At the same time the demand enabling toggle, formed by the cross-coupled NAND gates GB and GC, is set (i.e. a "1" state condition on lead SL) by the opening of NAND gate GD under the control of the timing pulse on lead TSX (lead TR being currently in the "0" state). The "one" state port demand signal PDEM is consequently produced from the output of NOR gate GE (i.e. both input leads in the "O" state) if there is currently a "1" state condition on the "bus valid" control signal lead of the X BUS to open NAND gate GF. When the demand has been accepted by the queue sorting control circuit the demand enabling toggle is reset by a "1" state signal on lead TR which persists for the duration of the timing signal on the timing wire of the Y BUS.

The outputs of the demand address interrogation circuits P1DEM to P4DEM inclusive in FIG. 4, are applied to the store module queue sorting circuit SQSC to resolve clashes between demands to the store access unit. If the storage module associated with the particular access unit if free when the module address is recognised, the demand is allocated immediate access to the storage module irrespective of any port priority order. If the storage module is busy on another access, subsequent demands on other ports are held until they can be given access in priority order. Each unaccepted demand remains with its demand lead raised until acknowledged by the activating of the Y timing wire.

The queue sorting circuit allocates cycles, by activating the relevant ones of the port clock selection leads PCLO1 to PCLO4 and PCLI1 to PCLI4, to the selected port by connecting that port to the storage module over the internal highway IH.

The queue sorting circuit SQSC is controlled by the store access unit timing control STC which includes command decode and timeout circuitry for the administration of the various demands. The timing control STC also generates the response timing wire pulse for return to the active module when a demand therefrom is accepted.

The queue sorting circuit is based on three levels of priority in an eight port population. Two ports are allocated the highest priority, two ports are allocated middle priority whereas four ports are allocated low priority. The top level of priority is guaranteed one storage module cycle in every two; the middle priority level is guaranteed one cycle in four whereas the low priority level is guaranteed one cycle in eight. Demands of the same priority are allocated on a "first come first served" basis while simultaneously demands are settled randomly. Typically the highest priority level ports are allocated to channel modules so that the effects of demand delays are not loaded onto peripheral transfers.

4 MULTIPLEXOR

A block diagram of a multiplexor is shown in FIG. 6 and it will be realized that the equipment provided is very similar to that provided in a storage module access unit. The main difference of course is that the multiplexor unit multiplexes processor and channel module bus demands onto a single peripheral data bus PDB, through incoming and outgoing peripheral bus interface equipment I/CPIF and O/GPIF, rather than to a storage module. The multiplexor module concentrates the demands from active modules (i.e. processor and channel modules) onto a single peripheral bus, thereby removing the need for a variable-port facility on the peripheral equipment access units. The peripheral equipments become insensitive to system growth in the form of additional active modules since an extra processor or channel module bus terminates upon one port of each storage module access unit and one port of the multiplexor module.

The multiplexor module includes input gating such as MIPG1 and output gating MOPG1 for each processor of channel module bus terminating port (PA, PB, PC or PD). The input gating array includes a demand address interrogation circuit which checks the module address of each demand against the plugged-up value of the module in the same way as that shown in FIG. 5. Additionally the demand queue sorting circuit MQSC and the timing control circuit MTC correspond with those used in the storage module access unit. The outgoing peripheral bus interface O/GPIF performs a multiplexing function which distributes each selected demand from the selected multiplexor port over the internal highway to the peripheral bus PDB, whereas the incoming peripheral bus interface I/CPIF handles signals in the opposite direction.

5 CHANNEL MODULE

A clock diagram of the equipment provided in a channel unit is shown in FIGS. 7a and 7b which should be placed side by side with FIG. 7a on the left. In a system containing more than a fairly small number of input/output devices, frequent transfers of data blocks from or to the peripheral equipments would result in the processor modules devoting a large portion of their time in supervising those data transfers. Once a block transfer has been initiated it is a routine matter to transfer the words of the block from source to destination. This routine operation is provided by pre-programmed facilities in the channel module. The channel module is, therefore, a data copying device which is capable of interleaving up to eight data transfers at a time. Each data transfer is regarded as taking place through a "channel" between the source device and the destination device with the transfer carried out under the supervision of the channel module.

In order to supervise the operation of a channel module a process (program), running on any processor module, addresses a channel module as though it were a peripheral equipment. this enables the process to "read-from" or "write-to" certain internal administration registers of the channel module and each individual channel, to initiate transfer operations. Once initiated, a channel module addresses storage modules and peripheral equipments over its channel module bus as an active module (i.e. using the same type of bus as the processor modules). The channel module operates under micro-program control exercised by the micro-program control unit uPROGUC, which produces micro-program control signals uCS to activate the gating equipment of the channel module. In FIGS. 7a and 7b various gates are shown as circular symbols having two arrowed input paths. One input path represents a data path, and equates to a 24 bit parallel data path, whereas the other path (which is not referenced) represents a micro-program control signal activated path which controls the passage of data "over" the gated path. The two peripheral buses PDN and PDM are terminated on the channel module access unit CAU which sorts demands from the multiplex or modules. Within the channel module there are three groups of register (i) channel register stacks (stacks CCSTK, DSTK, ASTK, CLSTK and CBSTK), (ii) command registers (STSREG, CREG, SCHR, DIREG, DOREG, BDAR and DPB) and (iii) special purpose protection register stacks (SLSTK and SBSTK) and each will be considered in detail below.

Channel Registers

Each channel, of which eight typically may be provided, is allocated one line in each of the channel register stacks. Hence each channel includes (a) a channel control register CC, (b) a pair of data registers D, (c) a pair of current address registers A and (d) a pair of protection registers CL and CB defining the source and destination data blocks of the transfer.

The channel control register CC contains indicators relating to the current state of the channel and each bit of the control register is accessible, over gates GA and the channel module highway HA, to the data transfer administration process when the channel is "off-line" and is conditioned by the information in the data-out register DOREG where the channel is on-line. Typically the control register includes information indicating the current state of the channel operation sequencing in accordance with the load, poll or cleardown sequence of a channel transfer operation.

The data register D are used to hold (i) the latest accessed data word which is in transfer from the source area to the destination area and (ii) an arithmetic sum with no overflow defined as a "block-check" of the data words transferred. For diagnostic purposes the registers are addressable when the module is off-line through the "back-door" over gates GB.

The source and destination current address registers A are up-dated during transfers such that at any instant they contain the current source address and the current destination address.

The two pairs of protection registers CB and CL define respectively the base and limit addresses of the source and destination blocks. At channel start-up time the processor performing the transfer administration process gives the channel module pointers for these two parameters which are known as capabilities. For diagnostic purposes "back-door" addressing, over gates GC and GD, of the channel capability registers is available when the module is "off-line."

Command Registers

There are six command registers which are addressable by the processor systems, using the "back-door addressing register" DBAR, when the channel module is "on-line" and these registers are effectively all part of the channel module's access unit.

The command registers are all shown within the dotted box of FIG. 7a and each register is addressable over the "back-door" using the back-door address register BDAR to select the required other command register. These command registers equate closely to the administration registers which are provided in a peripheral equipment access unit to be described later.

The status register STSREG contains full/empty indicators defining the current states of the other back-door addressable registers within the channel module. This register also includes channel module fault indicators and a copy of most of the control indicators including the "on-line" indicator which is immediately switched to the "off-line" state when one of the fault indicators is set. It is addressable over gates GE by a running process.

The control register CREG contains a control bit for each function which is made available. Typically the control register includes (i) on-line, (ii) stop, (iii) reset, (iv) inhibit interrupts, (v) single slot step and (vi) inhibit micro-program decode bits for use in diagnostic and channel module control operations. This register is back-door addressable by a running process over gates GF.

The scheduling register SCHR is divided into eight three-bit binary fields and is used to write channel identities into the shift register SFT which controls the register stack address selector RSAS on each channel module scheduling slot. Hence process access to the scheduler register, over gates G2, allows the allocation of real-time to each channel of the channel module.

The data-in register DIREG consists of two registers one containing information on individual channel fault indicators together with channel identity information. The fault indicators in this register relate to conditions which cause premature cleardown of single transfers rather then those indicators in the status register which set the channel module off-line. The data-in register gets its title from the fact that the transfer administering process can obtain information from this register. The register may also be used on a diagnostic routine to interrogate the output from the result register RESREG. The second data-in register is used to hold the data block-check for a particular channel and both are back-door addressable using gates GG. The data-out register DOREG is so named as it carries information outwards into the channel module from the control system. This register may be used to carry control information defining load, poll or cleardown for each channel of the channel module at channel start-up time. Typically bits 0 to 2 define the channel address in binary one-out-of-eight form whereas bits 3 to 7 define the channel transfer sequence stages in linear fashion, two for load (bit 7 load source, bit 6 load destination), one for poll (bit 5) and two for cleardown (bit 4 cleardown on source, bit 3 cleardown on destination). It will be realised that the data-out register provides a facility for external control of the sequencing of each channel. By manipulation of these control bits a channel can be "primed" without entering the cleardown sequence, a channel can be prematurely forced into a cleardown sequence or a channel can be restarted at a poll sequence without loss of internal information. At each scheduling slot the stack address produced by the shift-register SET is compared with the address in bits 0 to 2 of the data-out register DOREG and if coincidence is found the control information (bits 3 to 7) is written into the control register of the addressed channel. At the completion of each stage of the sequence (i.e. load, poll or cleardown) the internal hardware of the channel unit resets the appropriate bit in the channel control word thereby enabling the selection of the following stage of the sequence. The output buffer OPB is simply used as a buffer when reading any of the addressable administration registers.

Special purpose protection registers SBSTK and SLSTK

In the preferred embodiment of the invention the processor modules employed are of the type disclosed in copending application No. 25245/70 and consequently all blocks of information are defined by segment descriptors and all processes are allocated capabilities (segment descriptors plus access-type-code information) only for the segments to which they have access. In the storage system a so-called master or system capability table exists in which each addressable system resource (i.e. storage segment, group of peripheral access unit administration registers and the like) is provided with an entry and each resource is defined by a pointer which is relative to the system capability table. The special purpose capability register stacks in the channel unit provide storage for the capabilities (i.e. base, limit and access type code) for the special purpose storage segments which are used by the channel module to control the set-up and execution of each block transfer sequence. No special instructions are provided for the loading of these registers, however, they can only be addressed by a processor module when the channel module is off-line. Consequently these registers may be written to, using the back-door addressing register BDAR and gates GH and GJ (FIG. 7*b*), as though they were data-out registers, by an input/output supervisory process. The special purpose capability registers are for (a) the transfer Dump Stack, (b) the System Interrupt Word and (c) the System Capability Table.

The transfer dump stack which is a segment in one of the storage modules, is used to enable the channel module to access source and destination capabilities for each of its eight channels. The transfer dump stack contains up to eight pairs of capability pointers each pair pertaining to the source and destination blocks for one data block transfer. The actual segment base and limit addresses for each capability are held in the system capability table which is used when the channel capability registers are to be loaded. Typically a channel module transfer initiating process running in the processor system writes to the channel module dump stack at the appropriate location, relative to a selected channel, a pair of pointer words one for the source and the other for the destination of the transfer. Each pointer word in the dump stack is relative to the base of the system capability table.

The system interrupt word capability register is a register storing the address of a storage word which has a bit allocated in it for each channel and each processor module in the system. Reference to co-pending application No. 41951/70 shows the use of these bits to indicate to the processing system that a channel has completed its transfer thereby allowing the control system to schedule one of its channel handling routines to deal with the stored information block.

6 PERIPHERAL EQUIPMENT ACCESS UNIT

FIG. 8 shows a block diagram of the basic equipment required in a peripheral equipment access unit. The actual full range of equipment provided for each peripheral equipment access unit will depend upon the facilities required and provided by the actual peripheral equipment served by the access unit. Basically the access unit consists of an access section AS and an administration register section RS. The access section terminates the two peripheral buses PDN and PDM and provides input and output gating PIG and POG together with demand interrogation logic DIN and DIM for each peripheral bus. The demand interrogation logic is similar to that shown in FIG. 5 and each demand output is connected to a demand sorting circuit DS which resolves concurrent demands and operates the selected input and output gating arrays.

Also included in the access section is an access control circuit AC which synchronises the execution of the chosen cycle, such as Read, Read and Hold, Write or Reset as defined by the state of the peripheral bus control signal leads. The access control circuit AC also includes timing pulse generation equipment for the transmission of command, address, data and parity signals into the administration register section RS and arrangements for reception of timing and control signals from that section's control circuit PCC.

The administration register section RS is particular to the device it is connected to over leads OPI and IPI. However all peripheral equipment access units are provided with a command register PCREG, a status register PSTSR and either or both data handling registers PDIR (the data-in register) and PDOR (the data-out register). All these registers, and others particular to the peripheral device, such as address registers and protection registers for bulk storage peripherals, are addressable by the control system and the received register address is passed by the access control circuit AC to the control circuit PCC which activates the relevant register selection lead from leads RSSI or RSSO. The administration registers perform similar functions to the "back-door" addressed registers provided in the channel module. Considering now the basic register set in the administration register section.

The data-in register PDIR is provided if the peripheral equipment is capable of providing input information to the control system and the register is loaded by the peripheral equipments output data. When the data-in register has been loaded an indicator bit (FULL-/EMPTY bit) is set in the status register PSTSR so that the system may be informed that information is available for input. Typically the control system (channel module) initiates a data-in register read cycle when it detects the set bit after having read the status word from the particular peripheral equipment. This results in the resetting of the particular status register bit allowing the peripheral equipment to reload the data-in register. Typically the data-in register may be equipped with byte assembly arrangements allowing byte producing peripheral equipment to be matched to the 24 bit control system words.

The data-out register PDOR is provided if the peripheral equipment is capable of receiving output information from the control system. This register also has an indicator bit (EMPTY/FULL bit) in the status register which may be used to inform the processing system when the data-out register has been emptied by the device and to inform the device when the data-out register has been re-loaded by the processing system.

The command register PCREG contains indicators which are written to by the processing system to control the functions performed by the peripheral equipment. Typically the command indicators include (i) an out-of-service indicator, (ii) a stop indicator, (iii) a general reset indicator and (iv) a fault bit reset indicator. Other indicators are provided according to the requirements of a particular peripheral equipment. Typically indicators will be provided to control the various actions (read, write, reset etc.) of bulk storage device.

The status register PSTSR contains indicators which may be read by the processing system and which record the current state of the associated peripheral equipment. Typically the status indicators comprise a copy of all the current states of the command indicators and include (a) an out-of-service indicator, (b) an off-line indicator, (c) a stopped indicator and (d) a fault indicator. Other indicators showing the results of various commands will also be provided in this status register in accordance with the functioning of the particular peripheral equipment. As already mentioned the data-in and data-out registers are provided with FULL-/EMPTY indicators in this register and if other administration registers are provided which are processor system adressable they will also be provided with such indicators in the status register.

SYSTEM OPERATION

From the above descriptions of the various access units associated with the peripheral equipments, storage modules, multiplexor modules and channel modules of a system of the type shown in FIG. 1 it will be realised that a process (i.e. program running in a processor) has the ability to communicate directly with a peripheral equipment or channel module. This operation is simply achieved by performing read or write operations upon the address locations which correspond to the administration registers of the access unit of the required peripheral equipment or channel module. Information may be gathered from a peripheral equipment by performing a read operation at an address which identifies the data-in register or status register of the peripheral equipment. Similarly information may be fed to a peripheral equipment by performing a write operation at an address which identifies the data-out or command register of the peripheral equipment. Considering FIG. 1 and assuming that a process running in processor module CPUA requires to read the status register of the disc backing store PD the operation performed because of the system configuration afforded by the invention resolves into a simple "read-data" instruction with the accompanying address defining, within the overall system addressing scheme, the identity of the status register of the access unit PAD. In actual fact the address applied to the data leads IL1 to 24 of the processor bus X BUS (FIG. 2) will define (i) a multiplexor module MPXN or MPXM, (ii) the peripheral equipment access unit PAD and (iii) the status register in the administration register section of that access unit. The control signal highway SIHCS of the X BUS of the processor bus PBA will be conditioned so that the three CW leads carry the "read" code (001). Hence when the timing wire TSX is raised to the 1 state, assuming the bus valid condition on lead BV is present, the demand address interrogation circuit in the input gating array MIPG1 (FIG. 6) of the addressed multiplexor will produce a demand signal. Assuming that no other demand condition currently stands at the addressed multiplexor module, the states of the X BUS will be passed through the addressed multiplexor module on to the peripheral bus PDN or PDM. Consequently the demand condition will be recognised by the demand interrogation logic DIN or DIM (see FIG. 8) in access unit PAD.

Considering now FIG. 8 the demand sorting circuit DS accepts the demand and opens gates PIGN and POGN or PIGM and POGM according to the demanding peripheral bus. Hence the X BUS signals are extended into the access section control AC and the administration register section RS of the access unit PAD (FIG. 1). The least significant bits of the address information on the X BUS defines the status register PSTSR and hence the control circuit PCC will be conditioned to activate signal SSR so that the contents of the status register PSTSR is fed onto the OL1 to 24 leads of the Y BUS of the relevant peripheral bus. This status information will be returned, over the selected peripheral bus (Y BUS section) and multiplexor module AND gates, into the processor module CPUA (FIG. 1) when the timing wire TSY of the Y BUS is activated. The reception of the status information by the processor module causes the termination of the timing pulse on the TSX wire and the consequent release of the busses, multiplexor module and peripheral access unit.

Typically the process requesting the status information may now define if a block transfer may be performed involving the disc backing store PD. Such a block transfer, which will involve polling of the data-out register in the peripheral equipment access unit, is ideally performed by one channel within one of the channel modules. However it is necessary for the block transfer initiating process to set-up the channel to be used prior to the transfer performance.

The channel module (FIGS. 7*a* and 7*b*) may be operated in one of two basic modes according to the state of the module on-line indicator in the status register STSREG. It will be assumed that the channel module to be used (say CUX in FIG. 1) is currently on-line and therefore that the three system capability registers, (defining the "transfer dump" stack, the "system interrupt" word and the "system capability table") are already loaded with the relevant capability information (i.e. base, limit and type code). The channel module is set up for a transfer by the input/output control process setting the relevant pointers in the transfer dump stack to define the source and destination areas to be used. For example, for an input transfer from a peripheral equipment into a main storage segment, the source pointer refers to a capability identifying the "data-in" register in the relevant peripheral equipments access unit, whereas the destination pointer refers to a capability identifying the main storage segment into which the incoming data is to be fed. In such a case the span of the destination capability is equal to the segment size (i.e. the number of words to be transferred). The end of transfer condition is reached when the destination current address equals the destination limit address, as defined by the comparator COMP in FIG. 7*b*. Therefore, the cleardown on destination control bit is set in the channel control register of the selected channel by the control process when setting up the transfer.

Channel set-up

To commence operation of a channel it is necessary for the address of that channel to be included in the shift register SFT. This is achieved by the processor module performing the input/output handles process writing by way of the channel module back-door, the selected channel's address into the scheduler register. Thus the processor module, such as CPUA in FIG. 1, applies to its bus PBA a write code together with an address word which defines the required channel unit CUX and the scheduler register SCHUR within. The channel module access section CAU (FIG. 7*a*) recognises the channel module address and activates gates G1 so that the scheduler register address is passed into the back-door address register BDAR. When the scheduler register information is forthcoming gate G2 is activated by the micro-program control unit μPROGCU in accordance with the decoded address information, produced by AD from register BDAR. The channel identity of the selected channel is therefore written into the scheduler register SCHR and thence in the correct sequence into the shift register SFT.

It is now necessary for the selected channel control register to be set up and this again involves a "backdoor write" operation this time involving the data-out register DOREG. The addressing operation causes the address word to be written, over gates G1, into the back-door address register BDAR and in this case the decoded address produced by the address decoder AD will define the data-out register DOREG. The data which follows the addressing operation therefore passes from highway HA into the data-out register DOREG over gates G3. This information defines (a) the selected channel address and (b) the transfer enable bits (load source, load destination, poll, cleardown on source and cleardown on destination).

During each scheduling period the micro-program control unit μPROGCU compares the state of the address field in the data-out register DOREG with the address of the currently scheduled channel at the output of the shift register SFT. When these two fields equate the relevant bits of the currently scheduled channel control register in the register stack CCSTK are overwritten by the transfer enable bits of the data-out register DOREG over gates G4.

From the above mechanism it should be apparent that the data-out register mechanism allows control to be exercised over the operation of any channel allocated a scheduling period. Typically the transfer enable bits will be set to activate the selected channel commencing with a load sequence.

Channel load

When the selected channel is scheduled the register stack address selector RSAS, which is conditioned by the output from the shift register SFT, selects the pertinent "line" in all the channel register stacks. The channel control register contents are therefore applied to the micro-program control unit μPROGCU and the load sequence is consequently commenced. Each channel load operation involves the loading of the source and destination capabilities and this is performed sequentially and involves four schedulings for each capability to be loaded. The loading operation involves reference to the system capability table at the entry defined by the corresponding pointer residing in the channel module's dump stack. Each system capability table entry as shown in co-pending application No. 25245/70, comprises three words (i) a sumcheck word, (ii) a base word and (iii) a limit address word. Each scheduling operation involves one store access operation commencing with the dump stack access. Each store access address is checked for "within limits" by the comparator COMP and each access is accompanied by micro-program control unit generated control signals on the control signal highway of the X BUS of the channel modules bus CBX. The actual control signal highways SIHCS and SOHCS of the X BUS and Y BUS are not shown in FIG. 7*b* for ease of presentation, however, it should be realised that the leads of SIHCS are controlled by micro-program control signals μCS whereas the signals on SOHCS are applied, as bus condition signals BCS, to the micro-program control unit μPROGCU in a similar manner to that shown in FIG. 2. The following description of the channel load operation is sectionalised under the four access operations required for each capability loading.

(a) Read channel dump stack pointer This operation is performed under micro-program control by the following steps, (i) selecting the dump stack capability register, (ii) forming the required pump stack address, (iii) accessing the dump stack for a read operation and (iv) storing the relevant pointer in the selected channel data register.

The first step is performed by conditioning the system capability stack address selector SAS, over leads μASS which are part of the micro-program control signal μCS, with the identity of the dump stack capability register. Hence both the base and limit addresses of the dump stack are applied to the comparator COMP.

The second step is performed by conditioning the leads μGD eith the selected channel identity address, activating gates G5 and conditioning the MILL to perform an add operation by activating the appropriate leads MμS. Consequently the address formed in the result register RESR will be the address within the dump stack of the required pointer.

The third step is performed by opening gates G6 and conditioning the X BUS control signal highway for a store read operation. The second step formed address is checked by the comparator COMP for "within limits" and a comparator condition signal CCS will indicate if an error has occurred or not. The store read operation will of course be conditional upon the within limits check being valid.

The fourth step is performed when the storage module addressed for a read operation in the previous step responds with the read data word over the Y BUS. Hence gates G7 will be activated and the pointer word will be read into the data stack DSTK at the selected channel.

(b) Read system capability table entry first word. As mentioned previously the system capability table entry comprises three words ( a sumcheck, a base address and a limit address) and the reading of each word of the entry constitutes a single access. Hence at the next scheduling of the selected channel the first word of the system capability table entry will be read. This is performed by conditioning leads $\mu$ASS to select the system capability, opening gates G5 and G8, activating the MILL for a read operation and after a "within limits" check opening gates G6. At the same time as the read operation is being performed gates G9 are opened as that the first word address of the entry is stored in the pertinent (i.e. source or destination) address register of the channel. When the sumcheck word has been read from the storage module of the memory gates G7 are opened and the sumcheck is placed in the data register of the channel.

(c) Read system capability table entry second word. This is a similar operation to that shown above however the address for the required word of the entry if formed by incrementing by one the address held in the address register of the channel. This is performed by opening gates G11, activating the MILL for a +1 operation and opening gates G6 when the "within limits" check has been completed. The incremented address is also circulated by way of gates G9 so that it is preserved for use in the next scheduling. When the base address word of the entry has been read from the system capability table and returned over the Y BUS to the channel module, gates G10 are activated and the base address of the particular capability.

(d) Read system capability table entry third word. In the next scheduling period gates G11 are activated, the MILL is conditioned for a +1 operation and gates G6 are activated after the "within bounds" check using the system capability register has been performed. The source or destination capability limit address is read from the addressed system capability table entry and fed, by way of gates G12, into the channel capability register limit section. The local sumcheck may then be formed by adding the base and limit addresses together (i.e. opening gates G13 and G14 and performing a MILL add) and this local sumcheck is then compared again in the MILL, by opening gates G15 and G8, with the entry sumcheck to check that the channel capability register has been correctly loaded. It will be recalled that when the first word of the entry (i.e. the sumcheck) was read it was fed into the channel's data register. Typically the MILL may be conditioned to subtract the local sumcheck from the read sumcheck and the result tested for zero using the mill condition signals MCS.

Upon the completion of the channel load sequence the transfer enable bits are "stepped-on" from the load" to the "poll" condition.

Channel Poll

Once the load sequence has been accomplished, and assuming that no fault condition has arisen, the actual data transfer phase is entered. During the transfer phase the peripheral equipment involved in the transfer is polled once at each scheduling of the selected channel. Assuming that information is to be transferred from the peripheral equipment (source) to a storage segment (destination) the load phase will be completed with the data-in register identity address in the base address of the channel's source capability register whereas the bounds of the receiving segment will be in the channel's destination capability register.

At the next scheduling of the selected channel the source register (i.e. the data-in register of the access unit of the peripheral equipment involved in the transfer) is addressed by opening gates G13 and, after a bounds-check, gates G6. The source address is recirculated, by way of gates G9 to the source address register. The information returned on the Y BUS from the addressed peripheral equipment will either be a data word for transfer or a peripheral register busy signal. The latter is indicated by the marking of the peripheral register busy lead in the condition signal highway of the Y BUS and is incorporated so that the data transfer may be synchronised with the fixed speed of a peripheral device.

Referring briefly to FIG. 8 and assuming that the demand has been extended from channel module CUX, by way of multiplexor MPXN in FIG. 1, to the peripheral data bus PDN, it will be seen that the demand identification circuit DIN will respond. The peripheral bus demand sorter DS will activate gates PIGN and POGN and the address of the peripheral equipment's data-in register PDIR will be passed into the access control circuit AC and then into the administration register section control circuit PCC. If the data-in register PDIR is "full" the response to the demand will be the activation of gate GDI and the return of the data word over the Y BUS to the demanding channel module. If the data-in register is "empty," indicating that the peripheral equipment has not yet assembled the next word of the data transfer in the data-in register, the peripheral register wire will be marked and returned to the demanding channel unit.

The information returning on the Y BUS will be gated using gates G7, into the channel's data register if the addressed register (data-in) is not indicated busy. If the register busy signal is marked the channel will reattempt the transfer at the next scheduling.

The channel module having accepted the data word from the addressed peripheral equipment now transfers this word to the destination storage segment. This operation is performed by opening gates G13 and, after the bounds-check in comparator COMP, gates G6. Consequently the X BUS carries the base address of the destination segment together with a micro-program generated WRITE control code. At the same time gates G9 are activated causing the address in the result register RESREG to be recirculated into the channel's destination address register in the address register stack ASTK.

When the addressed storage module responds (timing wire activated and detected by micro-program control unit using leads BCS) gates G8 are activated and the data transferred from the peripheral equipment is extracted and fed to the MILL. This information is then sent, over the X BUS by opening gates G6, to the addressed location in the destination segment. The partial data block-check is now computed by selecting the channel's block-check register in the data register stack DSTK, opening gates G8 and G15 and performing an add operation in the MILL. The result of the addition in the result register RESREG is then passed, over gates G9 into the block-check register in the data register stack DSTK and the transfer of a single data word is now complete.

The above sequence of events is performed for each word of the block to be transferred with the destination segment address, in the address stack ASTK, being incremented by one for each transfer. The current destination address will be bounds-checked on each store access by the comparator and when this address equates to the segment limit the comparator COMP will produce a condition signal (on leads CCS) indicative of this condition. The micro-program control unit $\mu$PROG tests the "cleardown on destination" enable bit in the channel's control register and sets the cleardown enable bit in the channel's control register.

Cleardown Sequence

The cleardown sequence is entered by only one channel at a time and channels are queued on the data-in register "full" indicator in the status register STSREG. Upon entering cleardown the data-in register full indicator is tested and if not set the accumulated block-check in the channel's data register is transferred into the data-in register DIREG, by opening gates G8 and G17 and the data-in register "full" indicator is set. All other channels entering the cleardown sequence will "hang-up" on the data-in register full indicator.

Having loaded the data-in register it is now necessary for the channel module to inform the processing system that the transfer is complete. It was mentioned previously that the system contemplated by the invention is admirably, although not exclusively, suited for use with an interrupt mechanism of the type disclosed and claimed in co-pending application No. 41951/70. Such an interrupt mechanism is based upon the use of a common system interrupt word held in the computing system's main store. As stated above each active device (i.e. processor module and channel module) in the system has a system capability register "pointing" to the system interrupt word and this word includes at least one discrete bit for each active device. The channel module therefore reads the system interrupt word so that it may rewrite that word back to the store with the pertinent discrete bit set. This operation is performed by conditioning leads 83 ASS to select the system interrupt word address, opening gates G5 and G6 and conditioning the control signal highway of the X BUS for a "read and hold" operation. The returned system interrupt word is written, by way of gates G7, into the channel's data register and is then transferred to the interrupt bit setting circuit IBS. This circuit IBS is also fed with the currently scheduled channel identity, from the output of shift register SFT, and this allows for the setting of a discrete bit in the system interrupt word for each channel. Upon completion of the setting of the discrete bit gates G18 are opened causing the newly adjusted system interrupt word to be written into the system interrupt word register SIWR. Gates G19 are then opened and the newly adjusted system interrupt word is written back into the system interrupt word location and the "read and hold" operation is terminated.

The channel module as far as the selected channel is concerned waits, with the block-check of the compelted transfer in the data-in register, until the interrupt condition, indicated by the newly set bit in SIW, is accepted by a processor module entering an interrupt handler process. This process in its execution reads the data-in register DIREG by way of the "back-door" of the channel module. As the data-in register is cleared the indicator bit therefore is reset and the next channel to be scheduled, which is "hung-up" in the cleardown sequence, will follow the same pattern indicated above.

In certain circumstances it is necessary for a real-time control system to be capable of handling large numbers of relatively cheap low activity peripheral devices such as telephone line circuits, telegraph character buffers, switching network control buffers and the like in telecommunications environments. The system so far described is not ideally suited as it stands to the handling of such peripheral devices for the following three reasons.

1. It is uneconomic to employ fast parallel acting devices such as the processor modules and channel modules to supervise every data transfer from the low-speed peripheral equipments as such supervision involves significant time periods which are spent solely polling equipments which are not yet ready for a transfer to take place.

2. It is both inconvenient and difficult to physically locate large numbers of devices in close proximity to each other and the processing system. An extended peripheral bus system interconnecting physically distributed devices introduces large delays as far as data transfers are concerned thereby slowing down appreciably all bus transfers.

3. the overall cost of providing each peripheral equipment with an access unit of the type described with reference to FIG. 8 is prohibitive.

Accordingly the low activity and slow data rate peripheral devices are interfaced to the system of FIG. 1 by way of a data collection and distribution system in which data is transferred serially and which is collectively known as the "serial medium."

7 THE SERIAL MEDIUM

FIG. 9 shows a typical arrangement of units which cooperate to form the serial medium. The serial medium is interfaced to the parallel bus system of FIG. 1 by way of a serial-to-parallel adaptor, shown as PA$\alpha$ and PA$\beta$ in FIG. 9. Each serial-to-parallel adaptor interacts with the parallel system of FIG. 1, by way of the peripheral busses PDM and PDN, as a normal peripheral equipment but it is also responsible for controlling, over its active interface port, the transfer mechanism for the serial medium. The serial-to-parallel adaptor conforms to the basic structure of the access units of the other peripheral equipments in the system of FIG. 1 in that it includes an access section and an administration section. A status register and a command register are provided in the administration section together with data-in and data-out register stacks. The actual configuration of the serial-to-parallel adaptor will be considered in more detail later.

Interconnecting each peripheral device with a serial-to-parallel adaptor are one or more switching stages. Each switching stage provides the functions of multiplexing and demultiplexing and stages may be cascaded to provide the required degree of concentration or dispersion. In FIG. 9 there are two types of data switching stages shown as primary, (PSα and PSβ) and secondary, (DSα1 to DSαN and DSβ1 to DSβN) data switching stages. The primary switching stages have one passive control port and a plurality, typically 64, of active peripheral interface ports, whereas the secondary switches have one passive control port connected to a particular one of the active peripheral interface ports on a primary switching stage and a plurality, typically 16, of active peripheral interface ports to which typically the peripheral devices interfacing with the external arrangements (e.g. telephone, telegraph or data switching network) are connected. Certain peripherals, typically low activity slow speed data processing peripherals, may be connected directly to primary switching stage ports which are physically located in closer proximity to the processor system.

When no transfers are in progress the data switching stages cycle round the active peripheral interface ports searching for a demand. When a demand is detected a path is set between the demanding peripheral interface port and the passive control port and the demand is passed-on.

Each peripheral device is interfaced to the serial medium by a passive serial interface unit such as SIU in FIG. 9 which provides correct termination and response to the serial medium message formats, and provides the necessary control and data storage functions for the associated peripheral.

In FIG. 9 a duplicated system is shown providing a secure path to every peripheral so that a single data switch failure cannot disrupt the performance serial medium.

Throughout the serial medium all inter-equipment connections are made by a standard serial interface six-wire cable. The six-wire cable consists of three wires in each direction. The two sets of wires are distinguished by suffixes X and Y, where X refers to the wires (XW) carrying signals from an active interface to a passive interface and Y refers to wires (YW) carrying signals from an active interface to a passive interface. From the above it can be seen that a "standard serial interface" consists of one active interface and one passive interface interconnected by a single length of six-wire serial highway. The active interface (serial-to-parallel adaptor or data switch peripheral interfacing port) controls the data transfers and supplies the timing signals for the transfers. A request to transfer data however may be initiated by a passive interface (data switch control port or serial interface unit of a peripheral) but it waits for an acknowledgment and timing pulses from the active interface of the "standard serial interface" before sending data.

Each six-wire serial highway consists of three wires in each direction and these are known as activity (AX and AY), data (DX and DY) and timing (TX and TY) wires. The activity AX signal is the primary control signal for the serial medium and indicates whether an output transfer is in progress. The timing TX signal is used to carry the timing pulses from the serial-to-parallel adaptor to indicate the clocking of the data bits of the data DX signal. The activity AY signal is used as a response signal during output transfers, and to indicate an input transfer request. The data DY signal is the data path for inward transfers and acts as a control signal for outward transfers whereas the timing TY signal carries timing signal originating from the timing TX signal path, to indicate the clocking of the data bits of the data DY signal.

An outward transfer sequence is indicated by a signal on the AX wire and is formed by information sent on the DX wire accompanied by timing pulses on the tX wire. During the outward transfer the AY, DY and TY wires are used to indicate back to the serial-to-parallel converter whether the message was routed correctly through the switching stages of the serial medium.

An inward transfer sequency is requested by a signal on the AY wire. The acknowledgment by a serial-to-parallel converter involves the DX wire together with a stream of pulses on the tX wire which are used by the requesting device to send information into the system on the DY wire accompanied by the returned timing pulses on the TY wire.

The various functional elements of the "serial medium" will now be considered before embarking upon a description of the handling of data transactions within that medium.

Serial-to-parallel adaptor

This equipment which is shown in block diagram form in FIG. 10, performs two functions. Firstly it acts as a parallel interface unit interfacing the serial medium SM on to the parallel bus system by way of the access equipment SAS using either of the peripheral data busses PDN or PDM. Secondly the serial-to-parallel adaptor provides the control for all data transfers involving the serial medium.

The serial-to-parallel adaptor conforms to the same basic configuration as all peripheral equipment access units connected to a peripheral data bus in that it has an access section SAS and an administration register section SRS. The access section terminates the two peripheral busses PDN and PDM and proivdes input and output gating SPIG and SPOG together with demand interrogation logic (DIM and DIN) for each peripheral bus. The demand interrogation logic may conveniently be similar to that shown in FIG. 5 and the demand output from each logic is connected to a demand sorting circuit DS which resolves concurrent demands and operates the selected input and output gating arrays. Also included in the access section is an access control circuit SAC wich synchronises the execution of the chosen access cycle (i.e. Read, Read and Hold, Write or Reset). The access control circuit SAC additionally includes (i) timing pulse generation equipment for the transmission of command, address and data signals into the administration register section SRS and (ii) arrangements for the reception of timing and control signals from the control circuit of the administration section SCC.

The administration register section includes (i) a command register SCREG, (ii) a status register SSTSR, (iii) a data-out register arrangement (D-OSTK and SOR), (iv) a data-in register arrangement (D-ISTK and SIR) and (v) a control circuit SCC. The command register SCREG performs similar functions to that performed by the command register in the access unit of any peripheral equipment and includes command indicators, such as stop, out-of-service, reset, fault reset and the like, which are written to by the processing system to control the system functioning of the serial medium path connected to that serial-to-parallel adaptor. The status register SSTSR, which is similar to that provided in the access unit of any peripheral equipment, includes status indicators which may be read by the processing system to ascertain the current operational state of the serial-to-parallel adaptor. Typically the indicators in the status register include copies of the command indicators together with fault status indicators and FULL/EMPTY indicators for the data registers and stacks included in the serial-to-parallel adaptor.

To enable asynchronous bursts of serial medium activity to be accomodated the serial-to-parallel adaptor incorporates data-in and data-out register stacks instead of single registers. The input stack D-ISTK is fed with input packets received from the serial medium by way of the serial input register SUR on a first-in, first-out queue basis. Each input packet consists of an address word and a data word and these words are received serially and registered in the serial input register SIR. This register, which may consist of two parts, is emptied to the data-in stack D-ISTK in parallel transfers for each word, under the control of the control circuit SCC in accordance with the state of the "full-/empty" status-indicator of the serial-input register in the status register SSTSR.

For similar reasons a data-out register stack, operated as a first in, first out queue is provided, into which output packets (arranged as an address word followed by a data word) are placed by the processing system. The output end of the data-out stack feeds a serial-output register SOR which converts the parallel address word and data word of each output packet into a serial message formed of address followed by data. A "full/empty" indicator is provided in the status register for the serial output register section and these indicators are used to control the unloading of the data-out stack D-OSTK.

The actual functioning of the serial-to-parallel adapted will be considered later when the operation of the serial medium is considered.

Serial data switching stages

Two types of data switching stages are shown in FIG. 9, primary switches PSα and PSβ and secondary switches DSα 1 to DSαN and DSβ1 to DSβN. Basically, as was mentioned previously, both data switches are of similar functional design and the block diagram of a typical secondary switch is shown in FIG. 11. A secondary switch consists of one passive control port CP and 16 active peripheral-interfacing-ports PP1 to PP16. Each active port is provided with a crosspoint-gating array which is activated, on a mutually exclusive basis, by the switch control circuit DSCC to connect the activity, data and timing wires in each direction of the port to those of the switch control port CP.

The data switching stage includes an outgoing demand detector DDO and an address counter SAC which co-operate to produce a demand signal on lead DSD from AND gate GDSD when a data message is forthcoming over the control port CP. The address counter also produces, for application to the control circuit DSCC, the data message address field which defines the required active peripheral interface port and this information is used by the control circuit to activate the required port crosspoint-gating array.

The data switching stage is equipped with a port-enable register PEBR which is provided with one indicator bit for each active port on the switching stage. Access to the port enabling register is provided by appropriating one of the active ports, typically the sixteenth PP16, thereby allowing a serial medium "write" operation to be performed on the portenable bits. The contents of the port-enable register PEBR are applied to the control circuit DSCC and each bit is used, when set, to inhibit the initiation of input transfers emanating from the corresponding port.

It was mentioned previously that the data switching stage, when not participating in a transfer sequence, is designed to continually cycle around the active ports examining the stage of the activity lead AY to find the first port demanding an input transfer. This operation is achieved by including a port-address-cycling counter, which sequentially addresses the activity wires of the active ports PP1 to PP15, and by providing a demand state detector to which the addressed activity AY is connected in the control circuit DSCC. The demand detector of course is subjected, at each addressing operation, to the state of the relevant port enable bit. Upon detection of a demand condition the port address-cycling counter in the control circuit is stopped and the crosspoint gates of the addressed port are activated. The control-port-gate array is then activated and the data switch remains in this state until a cleardown condition is detected.

When a demand is detected at the control port CP (i.e., an outgoing transfer is required) polling sequence looking for incoming transfer demands is suspended by stopping the port address cycling counter and the required port crosspoints are activated using the output from the address counter SAC. Again after the activation of the control port CP the switching stage control circuit remains in the above state until a cleardown condition is detected. At the end of the outgoing transfer the data switching stage resumes its input message scanning function from the point of suspension.

The control circuit DSCC includes a clash resolution arrangement which ensures that the data switching stage accepts an outgoing transfer in contention with an input transfer. The input transfer is suspended for the duration of the output transfer and the input message scanning function is not resumed until the end of all current transfer operations.

The input message scanning function is secured so that no single fault condition can cause the switching stage to skip over a port. This is achieved by providing two port-address-cycling-counters which are driven in parallel and are constantly compared. Any disparity between the main and stand-by port-address-cycling-counters causes the polling sequence to be frozen at the point reached and the sequence is not reset until the next output transfer cleardown condition is detected.

The first output transfer to occur when the switching stage is frozen is not propogated beyond the frozen switching stage and consequently the output transfer being attempted will fail thereby reporting the error condition while restarting the polling sequence at the faulty address.

Serial interface unit SIU

Each peripheral device connected to the serial medium is interface thereto by a serial interface unit, such as SIU in FIG. 9. FIG. 12 shows a block diagram of a serial interface unit which is divided into two subfunctions of (i) serial medium interfacing and access and (ii) peripheral device control.

The first function is provided by the serial medium access and interfacing equipment SAIS which provides two ports (SDPA and SDPB IN FIG. 9) on the serial medium for the associated peripheral device. The access equipment SAIS provides the functions of port-selection, address confirmation and control together with timing sequence generation for data transfers. The address confirmation function is performed by means of check codes which are "plugged-up" in the access equipment and are compared with a check code which is sent, with an outward transfer, over the serial medium to the serial interface unit immediately following the last bit of the address section of the message. The check code is also sent by the access equipment to the processing system as part of the address information of an inward transfer message at the end of the data section of the message.

The second function, peripheral device control is provided by the rest of the equipment shown in FIG. 12 referred as CS (control section) and this equipment is responsible for the ordered exchange of data between the peripheral device interface PDI/F and the serial medium. The control section contains system register such as the data-out register DOR, the data-in register DIR, the command register CR and the status register SR. A system read operation addresses either the data-in register or the status register whereas a system write operation addrsses either the data-out register or the command register. The addressing information is received serially over the data DX wire into the address-decoder AD. The data-in register is loaded by the peripheral device and when a unit of data has been loaded a data-change detector DCD is used to initiate a data transfer demand to the serial medium over lead AY. Similarly certain status bit changes may be detected, by the status change detector SCD, to cause data transfer demand initiation. Typically the status register contains indicators relating to the current state (on line, fault etc.) of the device and its control section registers (full-/empty indicators). The command register CR is written to by the system to control the functions of the peripheral device and its serial interface unit. Typically the command register includes device enable, reset, fault reset and the like indicator bits.

SERIAL MEDIUM OPERATION

The format of any message, transmitted through the serial medium, is composed of an address section, a check field section and a data section. During output transfers the three sections are propogated address section first, data section last whereas during input transfers the sections are propogated data section first, address section last. On output transfers each module or unit within the serial medium accepts and absorbs those relevant bits required to route the remaining bits of the message onwards. On input transfers each module or unit in the serial medium appends the bits required to locate or confirm the message source within the serial medium. It will therefore be realized that since message are built-up or broken-down in transit, the message length varies in accordance with the point at which it is viewed. The full message, where all bits are present, is only found at the interface between the serial-to-parallel adaptor and the primary data switching stage.

Inward message transfer

Peripheral devices on the serial medium are required to announce their changes of state, by message transfers towards the control or processing system. Typically a peripheral device causes a demand to be raised by changing the data currently held in the data-in register DIR (FIG. 12). The change is detected by the detector DCD and the AY wire of both interfaces, connecting the serial interface unit into the two serial medium paths (SDPA and SDPB in FIG. 9 for example), are activated to the demand state by way of OR gate GS1 (FIG. 12). At the same time the address selector (AS in FIG. 12) is conditioned to produce the address of the data-in register for use in the peripheral device address construction process. The demand condition on the AY wire is extended to the relevant data switching stage at least one of which it will be assumed is currently idle and is therefore scanning the AY wires of its active peripheral interface ports. The scanning process will be stopped upon addressing the demanding port and the demand is extended towards the serial-to-parallel adaptor by activating the crosspoint gating arrays of the addressed active port and the control port of the relevant data switching stage.

Eventually the demand will reach one or other of the serial-to-parallel adaptors and, if it has no outward message transfers to perform, the demand is acknowledged by the serial-to-parallel adaptor by a marking on the data wire DX while the AX wire remains unmarked and a series of timing pulses on the tX wire. These conditions are passed over the interfaces back to the demanding serial interface unit by way of the relevant data switching stages.

At the serial interface unit the demand on the other, inactive, port is cleared down and the accompanying timing pulses are passed over AND gate GS2 (FIG. 12) to control the serial shifting of the data-in register DIR. At the same time the control circuit SPCC opens gates GS3 and the data word held in the data-in register is sent over the selected path, on the data wire DX, to the relevant serial-to-parallel adaptor. The TX timing pulses are also returned on the timing wire TY of the path to clock the data into the serial input register SIR (FIG. 10) of the serial to parallel adaptor.

When the data has been shifted out of the data-in register DIR (FIG. 12) gates GS2 and GS3 are closed and AND gates GS4 and GS5 are activated to allow the check-code and the data-in register address (i.e. source register) to be transmitted on the succeeding timing pulses. Upon completion of this operation the access section SAIS drops the demand by removing the mark from the AY wire.

The message-end condition is detected in the relevant secondary data switching stage and the control of that switching stage causes the address of the demanding peripheral port, as defined by the stopped state of the address cycling counter, to be passed to the address transmitter AT (FIG. 11) which appends this address to the data stream.

So far the data message has been formed (i) by the contents of the data-in register, (ii) followed by a check-code (iii) followed by the source registers address and (iv) followed by the secondary data switching stage port address. The message will finally arrive at the serial-to-parallel adaptor in the above form with the port address of the primary data switching stage also appended. As mentioned previously the serial input register SIR (FIG. 10) includes arrangements for segregating the message into its data and address component parts and upon completion of reception the message will be passed into the data-in register stack D-ISTK. The timing pulses are terminated on the TX wire when the message-end condition (AY wire unmarked) reaches the control circuit SCC thereby terminating the transfer. At some subsequent data a read operation will be performed using the data-in register address of the serial-to-parallel adaptor to open gate GX by either a processor module or a channel module and therefore the data sent by the peripheral device when the change was detected will be passed into the processing system.

Outward message transfer

Outward message transfers are under the control of a serial-to-parallel adaptor and take presidence over inward transfers. Hence while the data-out register stack D-OSTK (FIG. 10) has an output packet in it, the serial-to-parallel adaptor will set-up an outward transfer regardless of any incoming transfers which may be in progress. Such an incoming transfer is suspended by the marking of the activity wire AX of the serial interface. Accompanying the marking of the activity wire AX the outward message, in serial form, is applied to the data DX wire from register SOR accompanied by timing pulses on the TX wire. As mentioned previously the outward message consists of an address section followed by a data section and each module of the serial medium uses an address field to set up the required path. Hence considering FIG. 11, the primary switching stage to which the serial-to-parallel adaptor is connected will detect a demand condition (wire AX marked) and gate GDSD will be activated. The first address field bits will be received by the address counter SAC and the control circuit DSCC will then be conditioned to activate the required active port crosspoint gates which, with the gates on the control port, will set up a through path for the rest of the message.

The message arriving at the required serial interface unit consists of a destination register address (i.e. the data-out register DOR or the command register CR), a check code and a data section. The access equipment SAIS (FIG. 12) is arranged to respond to the reception of the address and check-code information, if valid, by returning the timing pulses on the TY wire and marking the DY and AY wires. The address decoder circuit AD will activate gates GS6 or GS7 in accordance with the required destination register and the following data will be fed into the destination register.

When the message has been fully received the AY, DY and TY wires are returned, by the interface equipment SAIS, to the quiesent state allowing the serial-to-parallel adaptor to cleardown the path by restoring the AX and TX wires to the quiescent state. The transmitted data is now available in the serial interface unit's data-out register for example, for use by the peripheral device. Further transfers to the peripheral equipment of course cannot take place until the data-out register's full indicator bit in the status register is reset.

The above description has been of one embodiment only by way of example and it should be appreciated by those skilled in the art that a number of modifications can be made without departing from the scope of the invention. For example the system of FIG. 1 shows three processor modules, three storage modules and two channel modules whereas the actual number of modules provided for any particular system configuration will depend upon the particular facility requirements to be met.

Reference to "Understanding Digital Computers" by Paul Siegal published in 1961 by John Wiley & Sons, Inc.: New York and "Digital Computer Components and Circuits" by R.K. Richards published in 1957 by D. Van Nostrand & Company, Inc.: New York will provide typical examples of components, elements, circuit arrangements and design techniques referred to in this application and depicted in the drawings as block elements with the exception of the scratch-pad memory stacks and micro-program control unit in its read-only memory form. Reference to chapter 16 of "Semiconductor Memories" edited by Jerry Eimbinder and published in 1971 by John Wiley & Sons, Inc.: New York, however, provides information on typical location (or line) addressable random-access memories ideally suited to the fabrication of scratch-pad memory stacks. Chapter 14 of the same publication provides information on the fabrication of a micro-program control unit using read-only memory elements.

What we claim is:

1. A data processing system comprising in combination:

- a plurality of processor modules;
- a plurality of data communication paths for each processor module allocated on a mutually exclusive basis and arranged to carry processor module generated address information;
- a plurality of multi-port access units each including a data communication path selection and terminating means and an identity address recognition means conditioned with a unique identity code and responsive to the reception of said unique identity code within said address information when applied to any one of said data communication paths;
- a plurality of memory modules each including an individual access unit and
- a group of peripheral equipments each said including an individual access unit and each peripheral equipment access unit includes a plurality of processor module accessible registers and an accessible register selection means responsive to part of said address information, and said accessible registers include:
  - i. a first register into which processor module generated peripheral equipment control information is written by an interrogating processor module upon the activation of said identity address recognition means and said accessible register selection means in response to the application to said interrogating processor module's data communication path of address information defining the identity of (a) the particular peripheral equipment and (b) said first register.
  - ii. a second register from which peripheral equipment status information indicative of the current state of the particular peripheral equipment is read by an interrogating processor module upon the activation of said identity address recognition means and said accessible register selection means in response to the application to said interrogating processor module's communication path of address information defining the identity of (a) the particular peripheral equipment and (b) said second register and either or both of iii. a third register into which data to be passed to said particular peripheral equipment is written by an interrogating processor module upon the activation of said identity address recognition means and said accessible register selection means in response to the application to said interrogating processor module's data communication path of address information defining the identity of (a) the particular peripheral equipment and (b) said third register and iv. a fourth register from which data generated by said particular peripheral equipment is read by an interrogating processor module upon the activation of said identity address recognition means and said accessible register selection means in response to the application to said interrogating processor module's data communication path of address information defining the identity of (a) the particular peripheral equipment and (b) said fourth register.

2. A data processing system as claimed in claim 1 wherein said system includes at least one multiplexor equipment provided with a multi-port access unit and each said data communication path is terminated upon an individual port of each multi-port memory module access unit and each multiplexor equipment access unit and each multiplexor equipment is connected by an individual data transfer path to an individual port on all the peripheral equipment access units.

3. A data processing system as claimed in claim 2 wherein said system includes at least one input/output channel module each arranged to independently handle information transfers between said peripheral equipments and said memory modules and each channel module is provided with a unique data communication path terminated upon an individual port of each multi-port memory module access unit and each multiplexor equipment access unit and each channel module includes an access unit upon a port of which each individual data transfer path is terminated.

4. A data processing system as claimed in claim 3 wherein each channel module access unit includes (i) a plurality of processor module accessible registers (ii) an identity address recognition means and (iii) an accessible register selection means.

5. A data processing system as claimed in claim 4 wherein each channel module includes a plurality of sets of channel registers each set being used to store transfer control information relative to a single transfer process and including (i) a channel control register (ii) transfer source and destination current address registers, (iii) a transit data word storage register and (iv) source and destination block identity registers and said channel module includes means for transferring information between said processor module accessible registers and said channel registers.

6. An input/output arrangement for use with a data processing system in which said arrangement includes a multi-stage switching network having on one side a plurality of input and control ports which are connected to a plurality of peripheral devices, and on the other side to a plurality of message handling devices and each switching stage indludes common control equipment which includes (i) means for cyclically inspecting said input ports for a demand condition and (ii) means for connecting, upon detection of a demand condition, the demanding input port to a control port to pass the demand condition on towards a free message handling device which is taken into use for the reception of a message comprising data and address information, and each switching stage further includes address generation means arranged to generate an address portion indicative of the switching stage port over which the demand was extended and said address generation means includes address transmission means arranged to transmit said address portion immediately following the information stream received from the demanding peripheral device, and said message handling devices include means for buffering information messages passing between said input/output arrangements and said data processing system.

7. An input/output arrangement as claimed in claim 6 wherein each switching stage common control equipment includes means for suspending the cyclic inspection of its input ports upon detection of a demand condition on its control port and means are provided in the common control equipment to employ a predetermined number of information bits of a subsequently transmitted information stream to select and activate a particular input port over which the remaining bits of the transmitted information stream are to be directed.

8. An input/output arrangement as claimed in claim 7 wherein one of said input ports on a switching stage is connected to a port enable register in common control equipment of that switching stage and said port enable register includes one bit for each of the remaining input ports on that switching stage and said port enable register is cycled in sympathy with the cycling of said input ports and a bit when in one state inhibits the acceptance of a demand condition on the corresponding input port.

9. An input/output arrangement as claimed in claim 8 and in which each switching stage common control equipment includes a pair of input port address counters which are driven in synchronism and said common control equipment also includes a comparator arranged to inhibit the operations of both of said counters when said counters are not in sympathy.

10. An input/output arrangement as claimed in claim 9 wherein each peripheral device includes a serial interface unit providing access to at least two switching network ports and including a plurality of information stream identifiable registers.

11. An input/output arrangement as claimed in claim 10 wherein said registers include (i) a control register into which peripheral device and serial interface unit control information is written, (ii) a status register from which current operational state information relative to the peripheral device and serial interface unit equipment is read and (iii) data register for reception or transmission of information over the input/output arrangement.

12. An input/output arrangement as claimed in claim 11 wherein communication through said input/output arrangement is by way of serial communication links each comprising three leads in each direction of transmission and in which one of said leads is used to carry said information stream, a second of said leads is used to indicate the idle or busy state of the link whereas the third of said leads is used to carry timing pulses for synchronisation of said information stream.

13. An input/output arrangement as claimed in claim 12 wherein each serial interface unit includes a linking arrangement to interconnect the third leads of a serial communication link and said message handling devices include means for generating timing pulses for connection to the third lead of the serial communication link outgoing from the message handling device to a serial interface unit for each direction of information transfer.

14. An input/output arrangement as claimed in claim 13 wherein said serial interface unit includes a change detection mechanism associated with said status register and arranged to provide an indication when a change occurs in said operational state information.

15. An input/output arrangement as claimed in claim 14 wherein the activation of said change detection mechanism activates means in said serial interface unit to initiate a demand condition to said switching network.

16. An input/output arrangement as claimed in claim 15 wherein said serial interface unit also includes a second change detection mechanism associated with said data register for transmission of information over the input/output arrangement and activation of said second change detection mechanism causes said demand condition to be initiated.

17. An input/output arrangement as claimed in claim 16 wherein said message handling devices include means for storing a plurality of messages and further means to prevent the acceptance of a message from any of said peripheral devices until all messages for said peripheral devices have been transmitted.

* * * * *

UNITED STATES PATENT OFFICE

CERTIFICATE OF CORRECTION

Patent No. 3,787,818 Dated January 22, 1974

Inventor(s) John Spencer Arnold, et al

It is certified that error appears in the above-identified patent and that said Letters Patent are hereby corrected as shown below:

Title Page [54]"MULT-PROCESSOR DATA PROCESSING SYSTEM" should be --MULTI-PROCESSOR DATA PROCESSING SYSTEM--

Column 1, line 1 "MULT-PROCESSOR DATA PROCESSING SYSTEM" should be --MULTI-PROCESSOR DATA PROCESSING SYSTEM--

Signed and sealed this 23rd day of July 1974.

(SEAL)
Attest:

McCOY M. GIBSON, JR.
Attesting Officer

C. MARSHALL DANN
Commissioner of Patents